(12) United States Patent
Ho et al.

(10) Patent No.: US 10,074,224 B2
(45) Date of Patent: Sep. 11, 2018

(54) ACCESS MANAGEMENT SYSTEM

(71) Applicant: Gate Labs Inc., San Francisco, CA (US)

(72) Inventors: Harvey Ho, San Francisco, CA (US); Ehsan Saeedi, San Francisco, CA (US); Danial Ehyaie, San Francisco, CA (US)

(73) Assignee: Gate Labs Inc., San Francisco, CA (US)

( * ) Notice: Subject to any disclaimer, the term of this patent is extended or adjusted under 35 U.S.C. 154(b) by 66 days.

(21) Appl. No.: 14/736,126

(22) Filed: Jun. 10, 2015

(65) Prior Publication Data

US 2016/0307380 A1    Oct. 20, 2016

Related U.S. Application Data

(60) Provisional application No. 62/150,192, filed on Apr. 20, 2015.

(51) Int. Cl.
| | |
|---|---|
| *G07C 9/00* | (2006.01) |
| *H04N 7/18* | (2006.01) |
| *E05B 47/00* | (2006.01) |
| *G06K 9/00* | (2006.01) |
| *G10L 17/00* | (2013.01) |

(Continued)

(52) U.S. Cl.
CPC ...... *G07C 9/00079* (2013.01); *E05B 47/0001* (2013.01); *G06K 9/00288* (2013.01); *G07C 9/00039* (2013.01); *G07C 9/00158* (2013.01); *G07C 9/00166* (2013.01); *G07C 9/00309* (2013.01); *G07C 9/00563* (2013.01); *G07C 9/00571* (2013.01); *G07C 9/00896* (2013.01); *G10L 17/005* (2013.01); *H04L 65/1069* (2013.01); *H04N 7/186* (2013.01); *G07C 2009/00769* (2013.01); *H04W 4/80* (2018.02); *H04W 88/02* (2013.01); *H04W 88/06* (2013.01)

(58) Field of Classification Search
CPC ........................... G07C 9/00563; H04N 7/186
See application file for complete search history.

(56) References Cited

U.S. PATENT DOCUMENTS 6,404,337 B1 * 6/2002 Van Till ............... A47G 29/141
340/568.1
8,941,736 B1    1/2015 Scalisi
(Continued)

FOREIGN PATENT DOCUMENTS

WO    WO 2016/172119    10/2016

*Primary Examiner* — Zhubing Ren
(74) *Attorney, Agent, or Firm* — Levine Bagade Han LLP

(57) ABSTRACT

Disclosed are an apparatus and a method for remotely managing access to an area. An access management platform, which can be an electronic lock that is installed on, e.g., a door of a house, can enable a user to establish a virtual presence at the door. In one example, a delivery person activates a doorbell button/icon of the access management platform, which sends a message to a smartphone of the owner of the platform. The owner, who is at work, uses his smartphone to initiate a video stream using a camera of the platform, and a two way audio stream. The owner sees and initiates a discussion with the delivery person. The owner uses his smartphone to unlock the door, and asks the delivery person to open the door and deliver the package inside. The owner uses his smartphone to capture his signature to acknowledge the delivery.

30 Claims, 29 Drawing Sheets

(51) Int. Cl.
  *H04L 29/06*  (2006.01)
  *H04W 4/80*  (2018.01)
  *H04W 88/06*  (2009.01)
  *H04W 88/02*  (2009.01)

(56) References Cited

U.S. PATENT DOCUMENTS

| | | |
|---|---|---|
| 2002/0099945 A1 | 7/2002 | McLintock |
| 2003/0040980 A1* | 2/2003 | Nakajima .............. G06Q 10/08 705/26.8 |
| 2008/0129821 A1 | 6/2008 | Howarter et al. |
| 2011/0145053 A1 | 6/2011 | Hashim-Waris |
| 2013/0017812 A1 | 1/2013 | Foster |
| 2013/0057695 A1 | 3/2013 | Huisking |
| 2014/0070922 A1 | 3/2014 | Davis |
| 2014/0266669 A1 | 9/2014 | Fadell et al. |
| 2014/0267740 A1 | 9/2014 | Alomomani et al. |
| 2014/0340196 A1* | 11/2014 | Myers ................ G07C 9/00309 340/5.61 |
| 2015/0029009 A1 | 1/2015 | Scalisi et al. |
| 2015/0035987 A1 | 2/2015 | Fernandez |
| 2017/0076520 A1 | 3/2017 | Ho et al. |
| 2017/0132861 A1 | 5/2017 | Ho et al. |
| 2017/0345239 A9 | 11/2017 | Ho et al. |

* cited by examiner

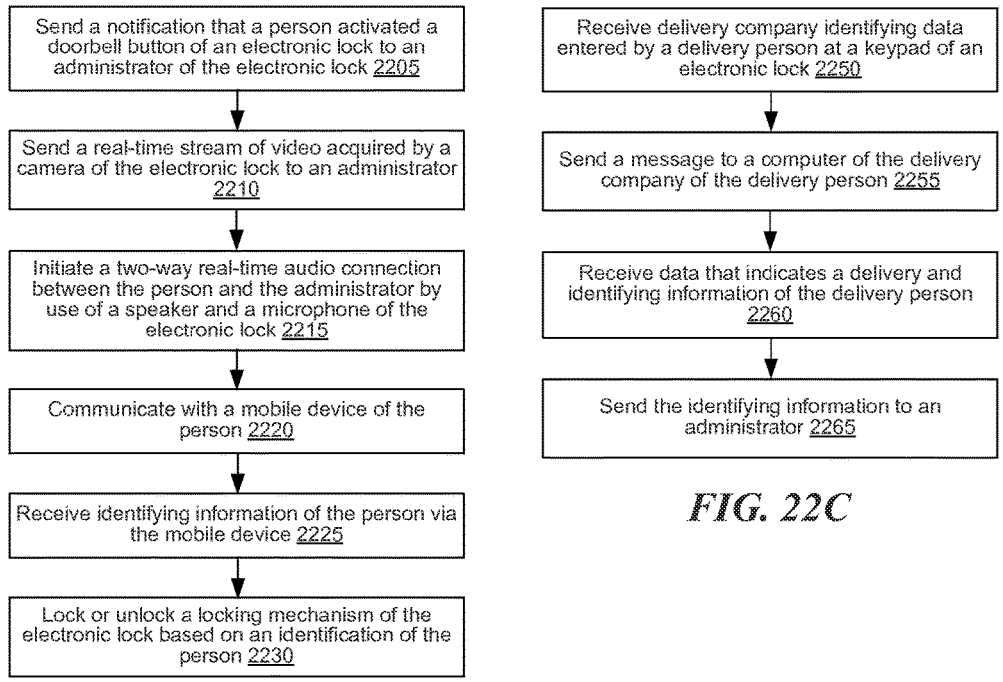
*FIG. 22A*
*FIG. 22C*
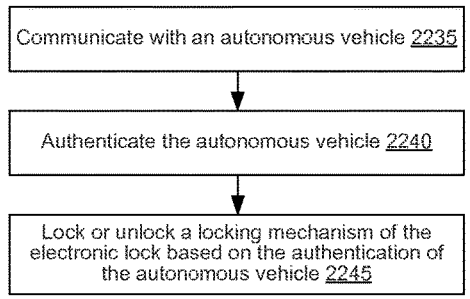
*FIG. 22B*

ACCESS MANAGEMENT SYSTEM

CROSS-REFERENCE TO RELATED APPLICATIONS

This is a non-provisional application filed under 37 C.F.R. § 1.53(b), claiming priority under U.S.C. Section 119(e) to U.S. Provisional Patent Application Ser. No. 62/150,192 filed Apr. 20, 2015, the entire disclosure of which is hereby expressly incorporated by reference in its entirety.

BACKGROUND

Delivery services deliver packages, merchandise, groceries, etc. to homes and businesses. When making a delivery that requires a signature, a driver of the delivery service may knock on a door or ring a doorbell of a home/business/etc. When a recipient is at the home or business, the recipient can answer the door, accept delivery of the package, and sign for the package delivery. When no person is at the home or business, the delivery driver often will not make the delivery. Instead, the package may be delivered on another day, the person to whom the package is addressed may need to go to the delivery service to pick up the package, the package may be returned to the shipper, etc. In some cases, items of a delivery that does not require a signature can be left outside a home or business. In such cases, there is a risk that someone may steal the delivered items.

SUMMARY

This application discloses technology related to an access management system that enables a person to remotely manage his door from anywhere in the world with access to the Internet. The disclosed technology includes a hardware platform, such as a remote door management platform, that enables the person to have a virtual presence at his door. In some embodiments, a remote door management platform replaces a door lock of a door and includes a camera, microphone, speaker, motorized lock, keypad, wireless communication system, battery power supply, and a processor. Such a remote door management platform can enable a person, such as a recipient, to interact with, for example, a delivery person, and enable the delivery person to deliver the delivery items inside the home or business, even when the recipient is not present at the home or business.

In one example, a delivery person walks up to a door equipped with a door management platform. In this example, the door previously had a door handle that included a deadbolt locking mechanism, and the door handle was replaced by the door management platform, which also includes a deadbolt locking mechanism in this example. The delivery person presses a doorbell button on the door management platform (also referred to herein as the "platform") to notify a recipient that the delivery person is at the door. Optionally, the delivery person can have a mobile device that communicates with the platform to identify the delivery person and the tracking number for the package. Additionally, the delivery person can also enter a key code that uniquely identifies the delivery service. The platform has Internet access, such as via a Wi-Fi network of the home or business, via a cellular network, etc., and can relay the received information to a mobile device of the recipient, such as to the recipient's smartphone.

In response to the press of the doorbell button, the platform emits a chime sound from the platform and sends a notification to the recipient's smartphone. The notification can include identifying information for the delivery person, such as identifying information that was received from the mobile device of the delivery person or from a computer of an employer of the delivery person, a live photograph of the delivery person that is taken by the platform, etc. Even though the recipient is not home, using his smartphone, he acknowledges the notification and chooses to bring up a video feed from a camera of the platform. The recipient recognizes that there is a delivery person at the door and uses his smartphone to initiate a two way real-time audio connection with the platform, which outputs the audio via a speaker of the platform. The recipient greets the delivery person and is told that there is a package that needs to be signed for. The recipient uses an application on his smartphone to sign for the package and sends his electronically captured signature to a computer system of the delivery service or to the delivery person's mobile device.

The recipient remotely unlocks the door by use of his smartphone, which sends a message to the platform instructing the platform to unlock the deadbolt of the door management system, which accordingly unlocked the door. The recipient, also using his smartphone, asks the delivery person to leave the package just inside the entryway of the home. The delivery person opens the door and drops off the package inside the home and closes the door. The video feed continues to run, and the camera of the platform is able to send video of the delivery person as he opens the door and delivers the package. The recipient sees that the package was delivered and remotely locks the door.

BRIEF DESCRIPTION OF THE DRAWINGS

One or more embodiments are illustrated by way of example in the figures of the accompanying drawings, in which like references indicate similar elements.

FIGS. 22A-C are flow diagrams illustrating examples of processes to manage access to an area protected by a door management platform, consistent with various embodiments.

DETAILED DESCRIPTION

Figure 1A:
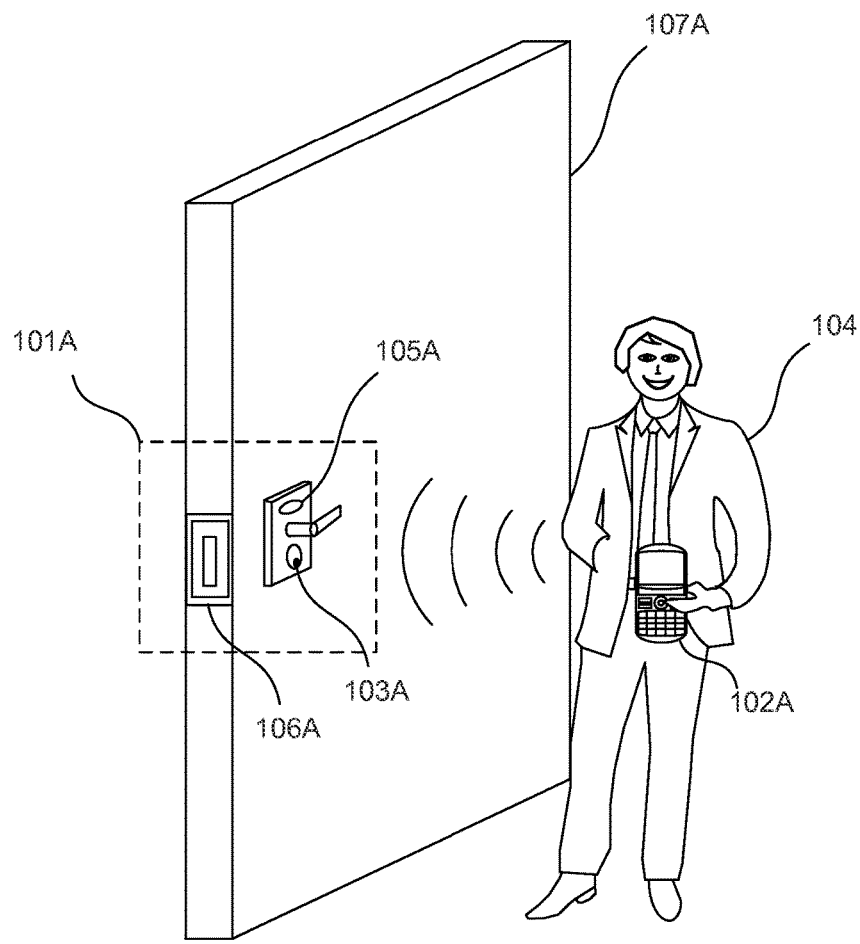
FIGS. 1A and 1B are each an illustration of an environment in which an electronic lock is used to restrict access to a door, consistent with various embodiments.

FIG. 1A is an illustration of an environment in which an electronic lock is used to restrict access to a door, consistent with various embodiments. The electronic lock of the embodiment of FIG. 1A is a b-lock. While the following discussion involves a b-lock, much of the discussion is applicable to other types of electronic locks, such as a password lock or a voice recognition lock, among others. B-lock 101A includes key hole 103A, biometric authentication device 105A, and deadbolt 106A. B-lock 101A is being used to lock door 107A, which is a door of a building, in order to restrict access to the building. In the embodiment of FIG. 1A, biometric data device 105A is a fingerprint scanner. A biometric data device is a device that can obtain biometric data of an individual that can be used to verify the identity of the individual.

Returning to FIG. 1A, b-lock 101A in the embodiment of FIG. 1A can validate a first time user in two ways. Other embodiments of a b-lock can validate a first time user in various other ways. The first method validates an administrator based on a security key obtained with a purchase of a b-lock. When user 104 purchased b-lock 101A, the packaging for b-lock 101A included a security key, which is a string of characters, such as alphanumeric characters or other symbols. User 104 installs a b-lock application on mobile device 102A, which is an Android smart phone in this example, and enters the security key into the b-lock application. User 104 then uses mobile device 102A to wirelessly send a signal to b-lock 101A that includes the security key. Upon receipt and validation of the security key, b-lock 101A allows user 104 to scan his finger using biometric data device 105A, and to register his fingerprint data so that user 104 can be verified to be an administrator of b-lock 101A. Examples of mobile devices include smart phones, tablets, portable media devices, wearable devices, laptops, and other portable computers.

The second method validates an administrator based on a physical key. When user 104 purchased b-lock 101A, the packaging for b-lock 101A included a physical key, which fits in key hole 103A and unlocks b-lock 101A. When user 104A inserts the physical key into key hold 103A and opens b-lock 101A, b-lock 101A allows user 104 to scan his finger using biometric data device 105A, and to register his fingerprint data as the fingerprint data of an administrator of b-lock 101A. In some embodiments, when user 104 installs a b-lock application on mobile device 102A, the b-lock application includes a security key that can be used to establish that user 104 is an administrator of b-lock 101A.

After the fingerprint data of user 104 is registered by b-lock 101A, user 104 no longer needs mobile device 102A, or any other mobile device, to open b-lock 101A. To open b-lock 101A, user 104 simply scans his finger using biometric data device 105A. B-lock 101A determines that his fingerprint data matches the registered fingerprint data of an administrator of b-lock 101A, and opens deadbolt 106A to allow user 104 to open door 107A and enter the building.

Figure 1B:
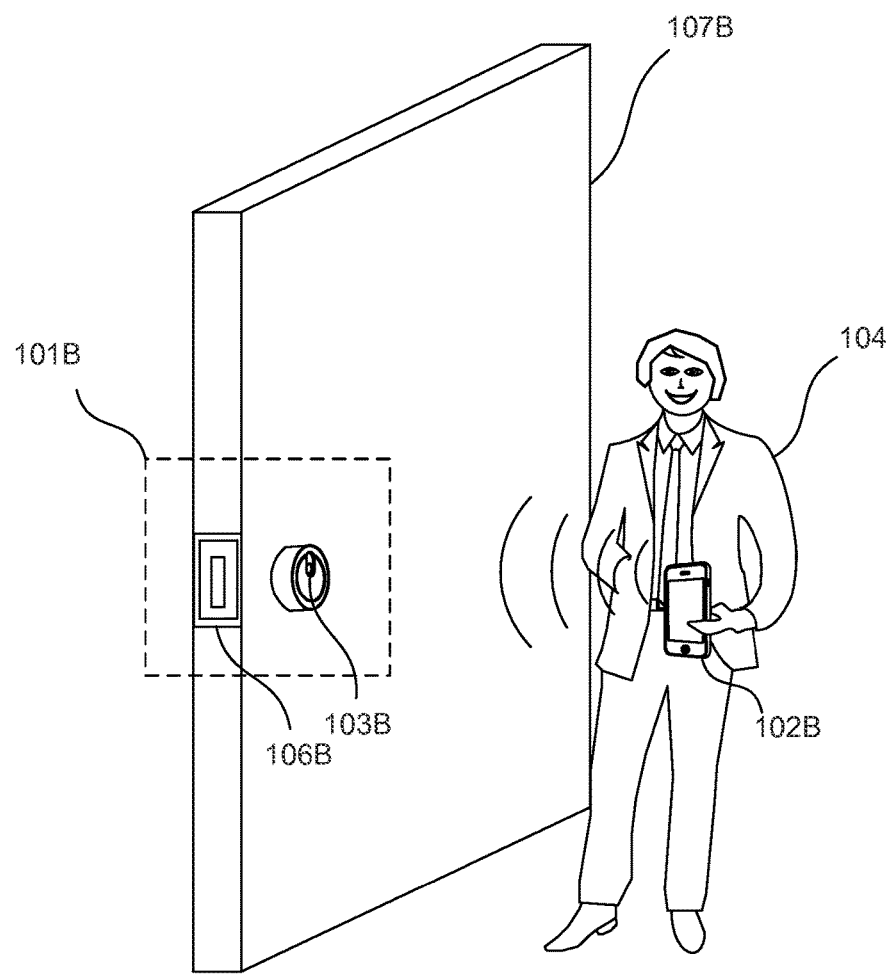

FIG. 1B is an illustration of an environment in which an electronic lock, such as b-lock 101B, is used to restrict access to a door, consistent with various embodiments. While the following discussion involves a b-lock, much of the discussion is applicable to other types of electronic locks, such as a password lock or a voice recognition lock, among others. The embodiment of FIG. 1B illustrates b-lock 101B, which includes key hole 103B and deadbolt 106B. B-lock 101B is being used to lock door 107B, which is a door of a building, in order to restrict access to the building.

Similar to b-lock 101A, b-lock 101B can validate a first time user in two ways. The first method validates an administrator based on a security key obtained during a purchase of a b-lock. Similar to the process described above for b-lock 101A, user 104 installs a b-lock application on mobile device 102B, which is an iPhone smart phone in this example, and enters a security key that was obtained when the b-lock was purchased into the b-lock application. User 104 then uses mobile device 102B to wirelessly send a signal to b-lock 101B that includes the security key. Upon receipt and validation of the security key, b-lock 101B allows user 104 to scan his finger using a fingerprint scanner of mobile device 102B. The b-lock application wirelessly sends the fingerprint data to b-lock 101B, and b-lock 101B registers the fingerprint data so that user 104 can be verified to be an administrator of b-lock 101B.

The second method validates an administrator based on a physical key. When user 104 purchased b-lock 101B, the packaging for b-lock 101B included a physical key, which fits in key hole 103B and unlocks b-lock 101B. When user 104 inserts the physical key into key hole 103B and opens b-lock 101B, b-lock 101B allows user 104 to scan his finger using a fingerprint scanner of or coupled to mobile device 102B. The b-lock application wirelessly sends the fingerprint data to b-lock 101B, and b-lock 101B registers the fingerprint data so that user 104 can be verified to be an administrator of b-lock 101B.

In some embodiments, b-lock 101B does not include a biometric data device. In these embodiments, a mobile device, such as mobile device 102B, can be used to capture biometric data, such as fingerprint data, and to send the biometric data to b-lock 101B, where b-lock 101B validates the fingerprint data and unlocks deadbolt 106B upon validation of the fingerprint data. In other embodiments, such as the b-lock embodiment of FIGS. 12, 13, and 14, the external facing face plate of b-lock 101B rotates. When in a first position, as is illustrated in FIG. 1B, key hole 103B can be accessed by user 104. When in a second position (not shown), such as when rotated 180 degrees relative to the position of FIG. 1B, the opening of the face plate enables a biometric data device to be accessible. In some of these embodiments, a biometric data device of b-lock 101B can be used to obtain biometric data of user 104, such as fingerprint data of user 104. B-lock 101B can validate the fingerprint data and unlock deadbolt 106B upon validation of the fingerprint data.

Figure 2:
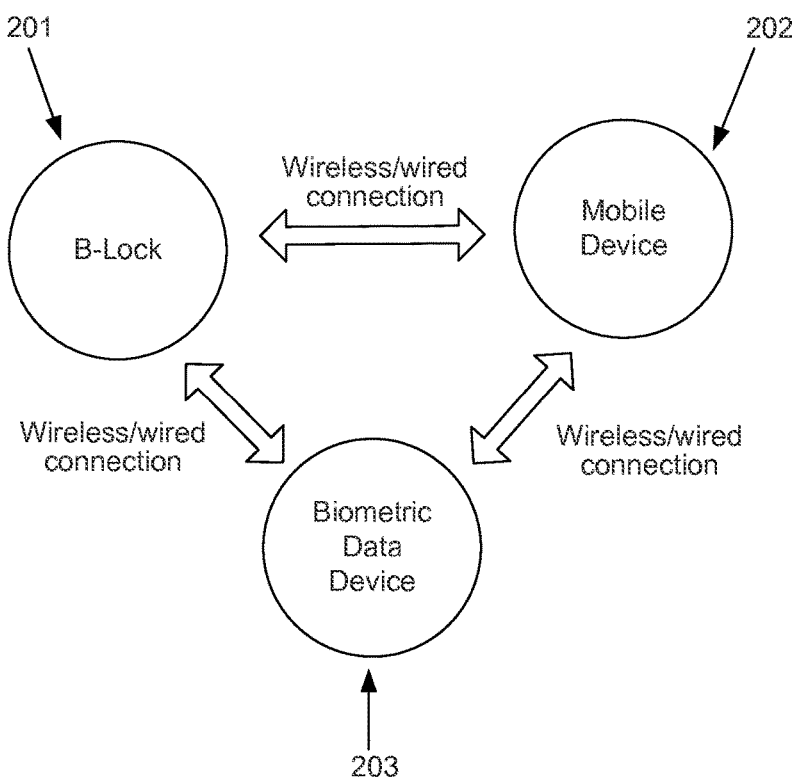
FIG. 2 is a system diagram illustrating a platform that includes a b-lock, a biometric data device, and a mobile device, consistent with various embodiments.

FIG. 2 is a system diagram illustrating a platform that includes a b-lock, a biometric data device, and a mobile device, consistent with various embodiments. B-lock 201 can be, e.g., b-lock 101A of FIG. 1A, b-lock 101B of FIG. 1B, b-lock 301 of FIG. 3, b-lock 601 of FIG. 6, b-lock 1100 of FIG. 11, b-lock 2001 of FIG. 20, door management platform 2100 of FIG. 21, etc. Mobile device 202 can be, e.g., mobile device 102A of FIG. 1A, mobile device 102B of FIG. 1B, a mobile device executing mobile/web application 602A or 602B of FIG. 6, etc. Biometric data device 203 can be, e.g., biometric data device 105A of FIG. 1A, a biometric data device of or coupled to mobile device 102B, such as a fingerprint scanner of or coupled to mobile device 102B, biometric data device 307 of FIG. 3, biometric data device 607A, 607B, or 607C of FIG. 6, fingerprint scanner 1305 of FIG. 13, etc.

Figure 3:
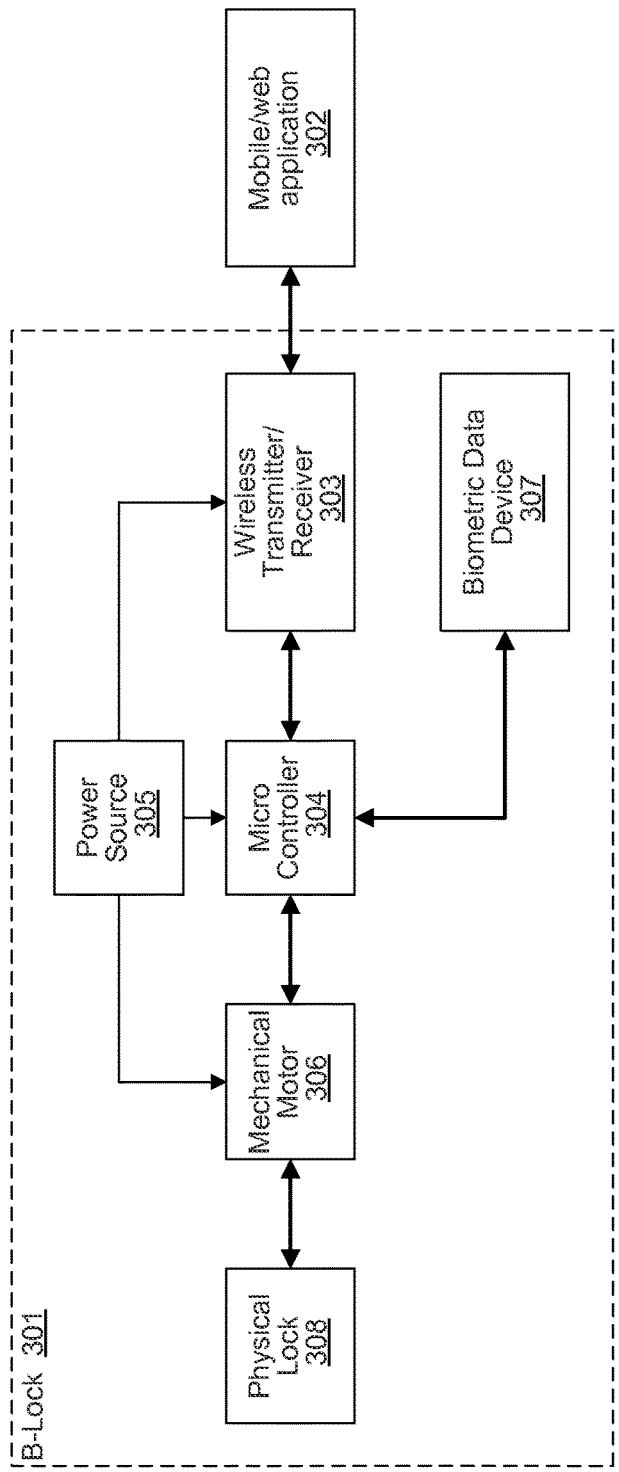
FIG. 3 is a block diagram illustrating an embodiment of an electronic lock that includes a personal data device, consistent with various embodiments.

FIG. 3 is a block diagram illustrating an embodiment of an electronic lock that includes a personal data device, consistent with various embodiments. In some embodiments, the electronic lock is a b-lock, and the personal data device is a biometric scanner, with which a user can input personal data, such as biometric data of a biometrically identifiable part of his body. In other embodiments, the electronic lock is a password lock, and the personal data device is a keypad, touchpad, microphone, etc., with which a user can input personal data, such as a password or pass phrase. In yet other embodiments, the electronic lock is a voice recognition lock, and the personal data device is a microphone into which a user can provide personal data, such as a sample of his voice. In some embodiments, personal data is identifying information that can be used to establish an identify of an individual. While the following discussion involves a b-lock, much of the discussion is applicable to other types of electronic locks, such as a password lock or a voice recognition lock, among others.

Figure 6:
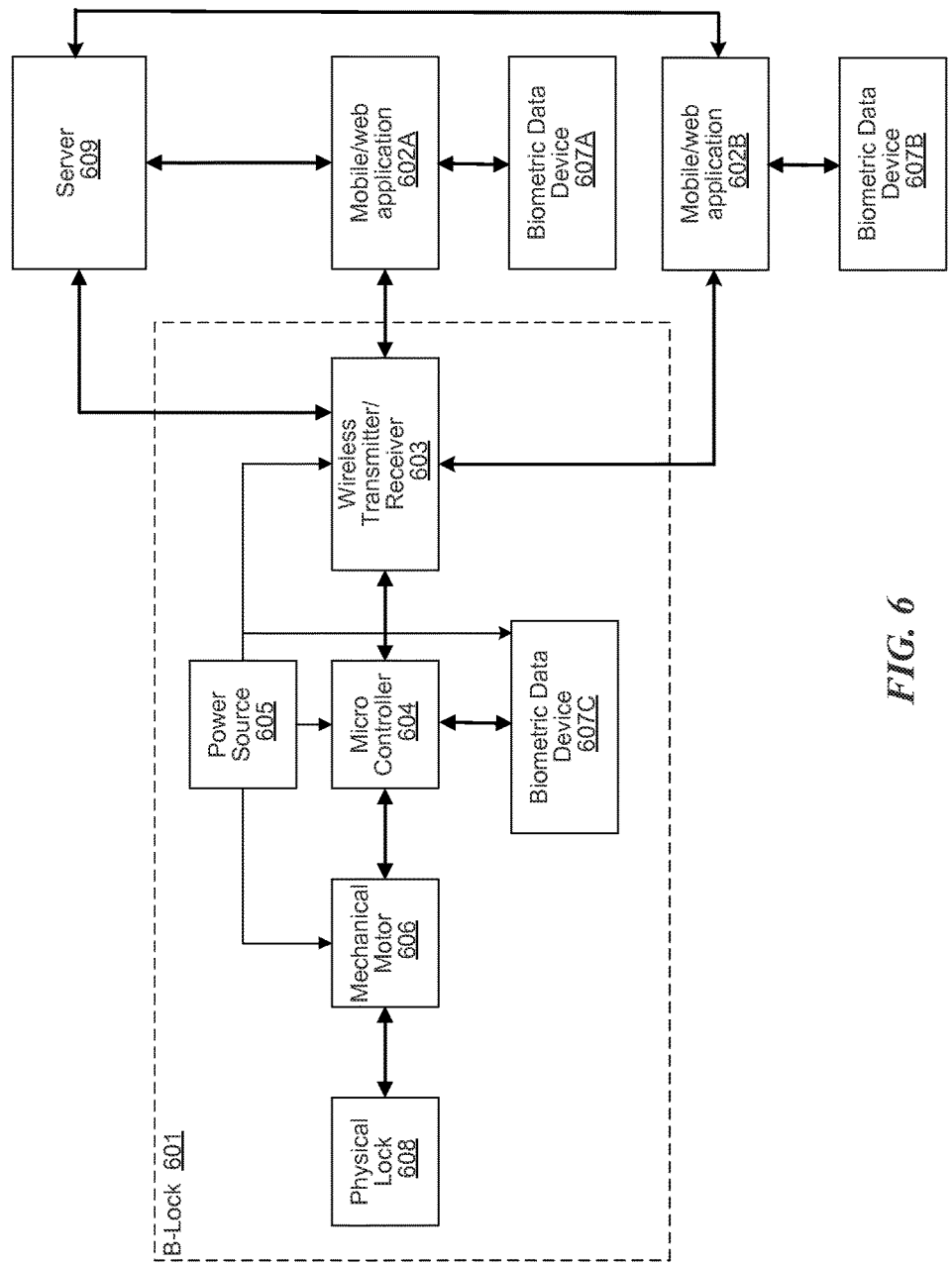
FIG. 6 is a block diagram illustrating an embodiment of an electronic lock that communicates with a server, consistent with various embodiments.
Figure 11:
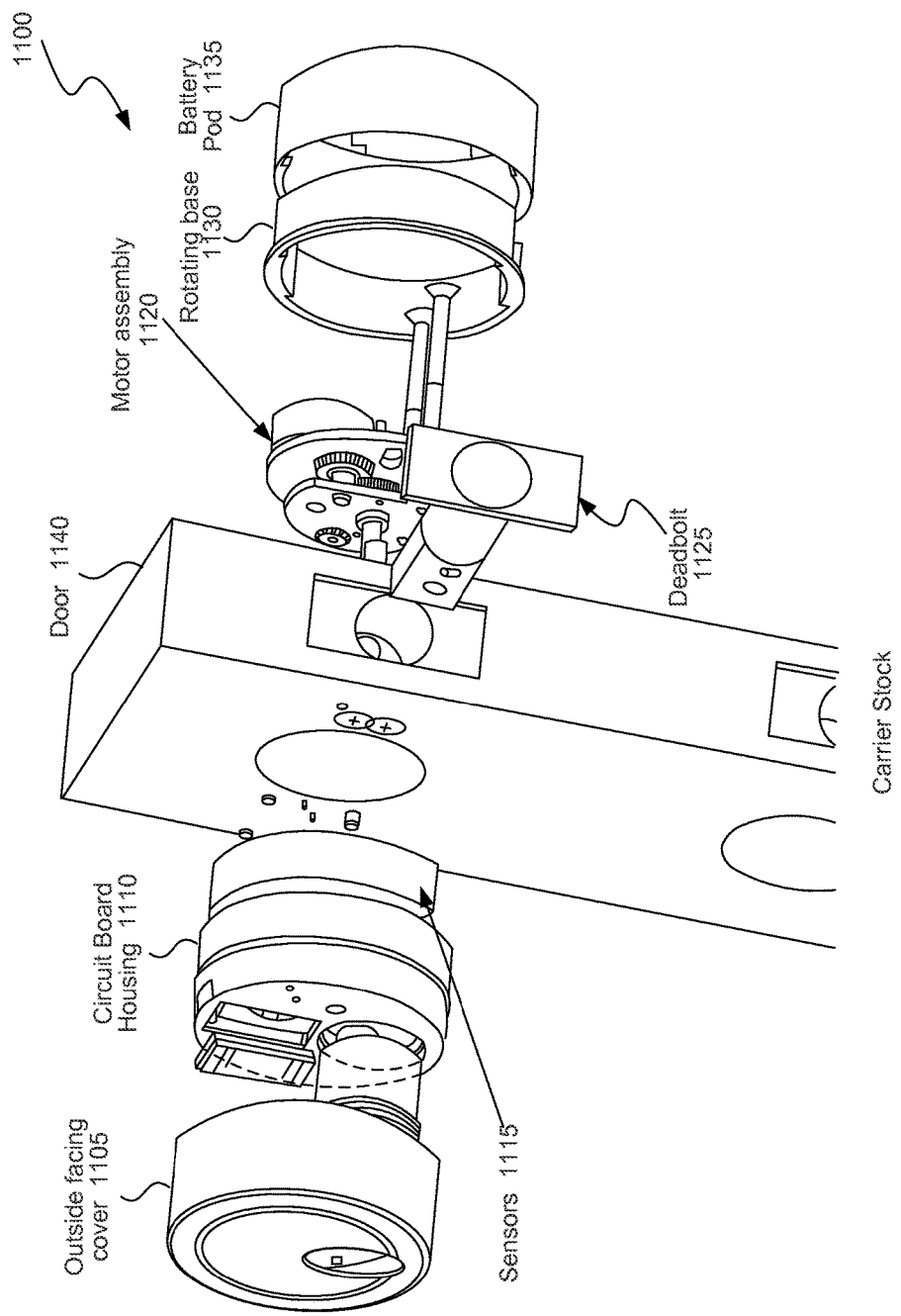
FIG. 11 is an exploded view illustrating the relationship of various components of an electronic lock, consistent with various embodiments.
Figure 20:
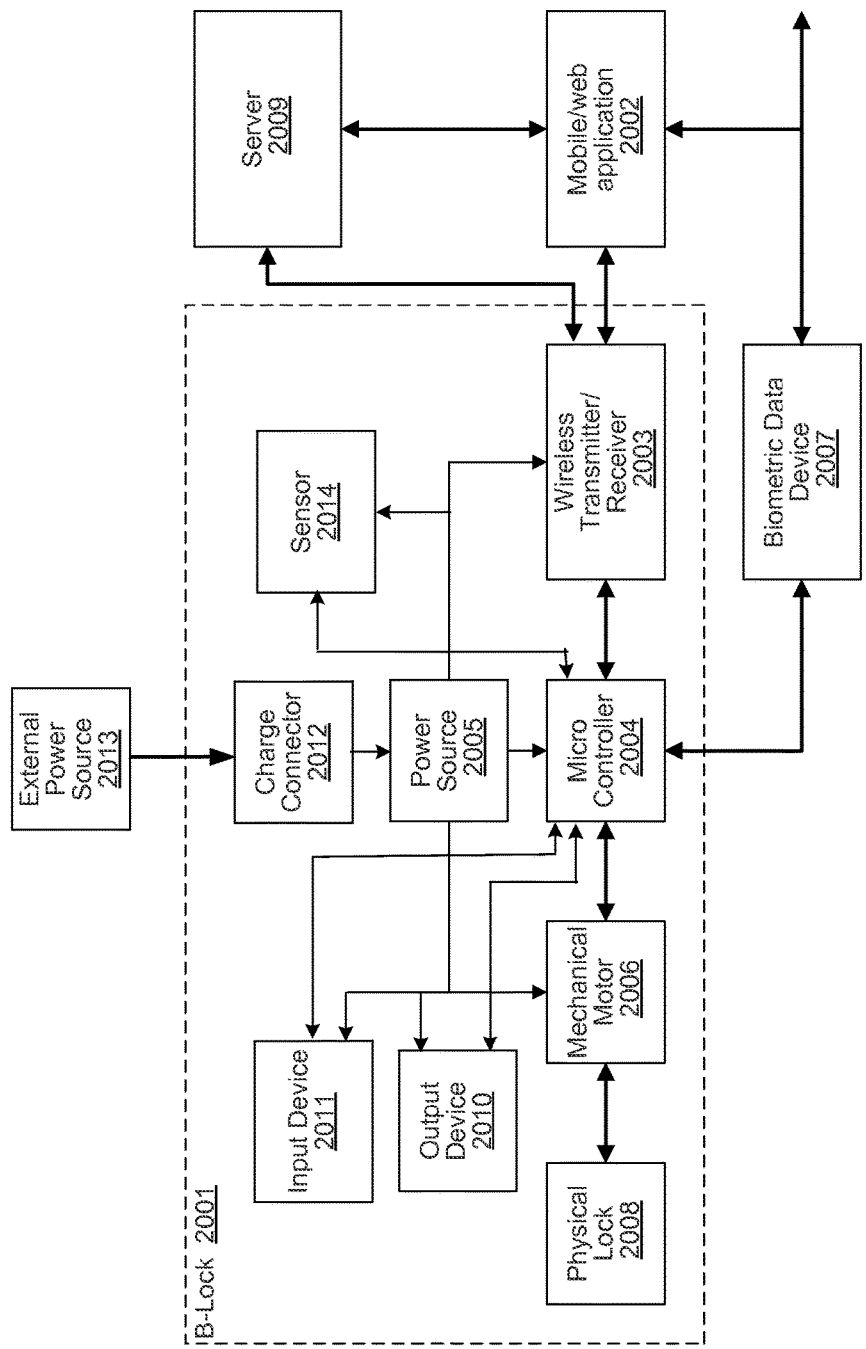
FIG. 20 is a high-level block diagram showing internal electronics of an electronic lock, consistent with various embodiments.
Figure 21:
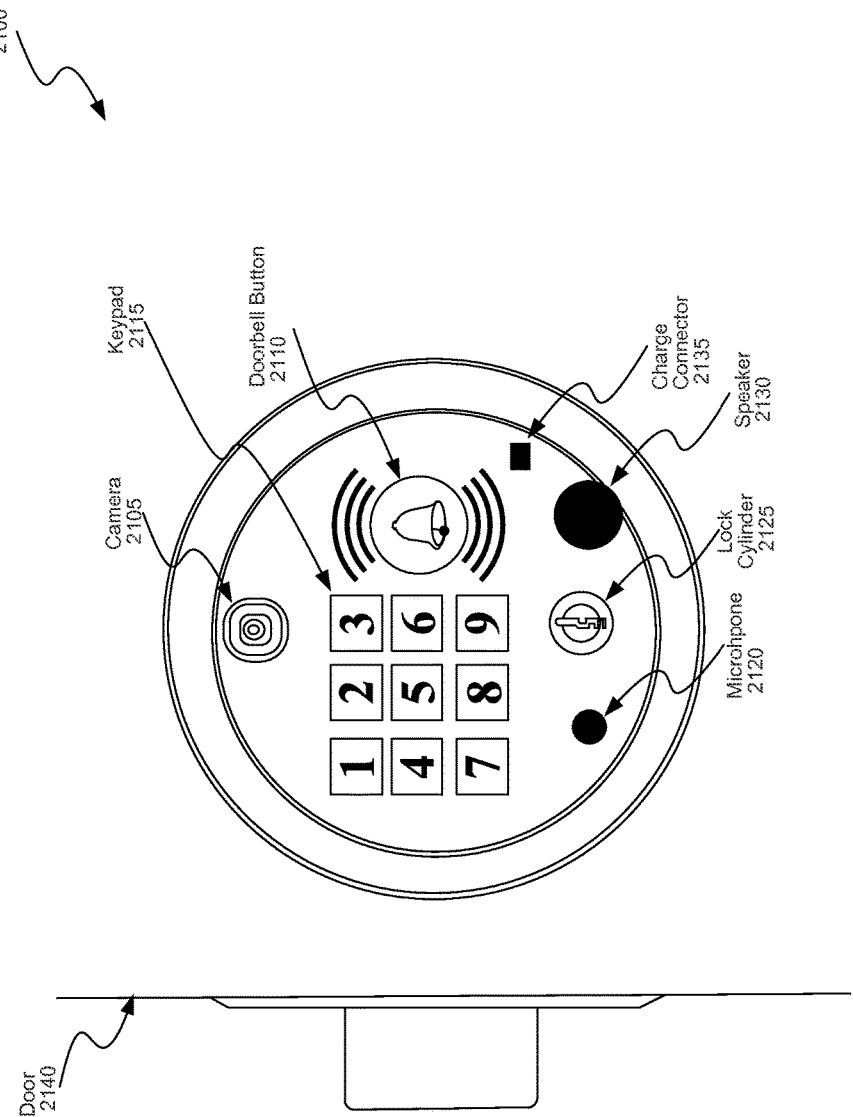
FIG. 21 is an illustration of an outside face of a door management platform that includes a keypad and a doorbell, consistent with various embodiments.

B-lock 301 of the embodiment of FIG. 3 can be, for example, b-lock 101A of FIG. 1A, b-lock 101B of FIG. 1B, b-lock 601 of FIG. 6, b-lock 1100 of FIG. 11, b-lock 2001 of FIG. 20, or door management platform 2100 of FIG. 21. B-lock 301 includes physical lock 308. As will be appreciated by a person of ordinary skill in the art, physical lock 308 includes some components that are similar to those of a standard lock for a particular application. For example, a b-lock for a particular application of locking a door of a building can include some components similar to those of a standard lock to lock a door of a building. The components can include, for example, a dead bolt, mechanical parts to cause the dead bolt to move and lock/unlock a door, a key hole/cylinder into which a key can be inserted to lock/unlock a door, etc.

As a second example, a b-lock for a particular application of locking a door of a safe can include some components similar to those of a standard lock to lock a door of a safe. The components can include, for example, a combination or security code entry mechanism, multiple dead bolts, each of which extend from the door and enter the door frame of the safe to secure the safe door, mechanical parts to cause the dead bolts to move and lock/unlock the safe door, etc. As a third example, a b-lock for a particular application of locking a door of a car can include some components similar to those of a standard lock to lock a door of a car. The components can include, for example, a latch to latch the car door closed, a key hole/cylinder into which a key can be inserted to lock/unlock the car door, a wireless receiver and a processing unit to receive a wireless signal (that includes a security code), to validate the security code, and to unlock/lock the car door upon validation of the security code, etc.

As discussed above, various embodiments of b-lock 301 can be used to lock any of various doors, such as a door on a building, a door on a car, a door on a safe, a door on a cabinet, etc. B-lock 301 can be unlocked and/or locked based on validation of biometric data, which is obtained by biometric data device 307. Biometric data device 307 is a device that can obtain data of a biometrically identifiable object where the data can be used to identify the biometrically identifiable object. Examples of biometrically identifiable objects include a finger, a hand, an iris, a face, etc. Examples of biometric data devices include a fingerprint scanner, a hand scanner, an iris scanner, a face scanner, a camera, etc. In some embodiments, biometric data device 307 is not integrated in a b-lock, but rather is integrated in or coupled to a mobile device, such as a mobile device that is executing mobile/web application 302.

Biometric data device 307, which is a personal data device, can obtain biometric data of a user, and can send the biometric data to microcontroller 304. Microcontroller 304 can have a local memory that stores various information, such as security keys, biometric information, access details, logs of user interaction, associated usage timestamps, etc. Microcontroller 304 can keep a record of owner and/or administrator information for b-lock 301. In some embodiments, each b-lock has a single registered owner. In some of these embodiments, in addition to having a single registered owner, each b-lock can have one or more administrators. An owner can authorize a user to be an administrator. Both owners and administrators can authorize a user to be able to unlock/lock a b-lock.

When a new user indicates a request to open b-lock 301 by scanning his fingerprint using biometric data device 307, the request is sent to microcontroller 304. Microcontroller 304 compares biometric data obtained by biometric data device 307 from the new user against registered user data that is stored in local memory, which can be non-volatile memory. If the biometric data matches a registered user that is authorized to open b-lock 301, microcontroller 304 signals mechanical motor 306 to actuate the deadbolt of physical lock 308 in order to open b-lock 301.

Power source 305 provides power to b-lock 301, and can operate on a battery energy source, a wired power outlet, etc. For example, power source 305 can be a rechargeable battery.

B-lock 301 can include light emitting diodes (LEDs), a display, etc. to indicate the lock/unlock status of b-lock 301 to users. Physical lock 308 can include a knob for manually locking/unlocking b-lock 301 that is accessible from the inside of the door on which b-lock 301 is mounted. Physical lock 308 can also include a key hole/cylinder that is accessible from the outside of the door on which b-lock 301 is mounted, and into which a user can insert a physical key to lock/unlock b-lock 301.

In various embodiments, wireless transmitter/receiver 303 can communicate via any of various technologies, such as a cellular network, a short-range wireless network, a wireless local area network (WLAN), etc. The cellular network can be any of various types, such as code division multiple access (CDMA), time division multiple access (TDMA), global system for mobile communications (GSM), long term evolution (LTE), 3G, 4G, etc. The short-range wireless network can also be any of various types, such as Bluetooth, Bluetooth low energy (BLE), near field communication (NFC), etc. The WLAN can similarly be any of various types, such as the various types of IEEE 802.11 networks, among others. In some embodiments, wireless transmitter/receiver 303 can also or alternately communicate via a wired connection, such as via internet protocol (IP) messages sent over a wired Ethernet network. In some embodiments, wireless transmitter/receiver 303 can communicate with a server, such as server 609 of FIG. 6.

Microcontroller 304 can maintain a log of entries and exits and can send the log information via wireless communication facilitated by wireless transmitter/receiver 303 to, for example, a b-lock application running on a mobile device, such as mobile/web application 302. Microcontroller 304 can log when a user opens b-lock 301 with a physical key, and can share this log information with the lock owner and/or administrator(s). Logs of b-lock 301 being locked and/or unlocked through the use of a physical key can, for example, inform the owner of events such as unauthorized access into a space (e.g., a burglary). In some embodiments, a voltage output of mechanical motor 306 is monitored by a circuit of b-lock 301 in order to sense when physical lock 308 is manually locked and/or unlocked using a physical key. In some embodiments, a capacitive/optical sensor of b-lock 301 can track the opening and closing of the door. B-lock 301 can be equipped with other sensors that track vibrations, temperature, etc. B-lock 301 can also be equipped with a display, touch sensors, and/or a camera to enable communication to and/or from users.

In some embodiments, biometric data device 307 can communicate with both microcontroller 304 and mobile/web application 302. Mobile/web application 302 can be a mobile or a web application that runs on, for example, a mobile device such as mobile device 102A of FIG. 1A or mobile device 102B of FIG. 1B. In some embodiments, biometric data device 307 is not part of b-lock 301, but is rather part of or coupled to a mobile device. FIG. 6 provides an block diagram illustrating how a biometric data device, such as biometric data device 607A, can be part of or coupled to a mobile device executing a mobile/web application, such as mobile/web application 602A which can be executed on a mobile device. Returning to FIG. 3, in some embodiments, biometric data device 307, rather than microcontroller 304, validates the biometric data, such as by comparing the biometric data to stored biometric data of users that are authorized to unlock/lock b-lock 301. The stored biometric data can be stored, for example, in a database. The stored biometric data can reside locally on microcontroller 304, can reside on biometric data device 307, or can reside at another location that is accessible via wireless transmitter/receiver 303. If a user is verified as being authorized to lock/unlock b-lock 301 at the time of the verification, b-lock 301 will lock or unlock the door/gate on which b-lock 301 is mounted.

In some embodiments, mobile/web application 302 can help users of b-lock 301 to organize and manage access to a protected resource, such as a house, a car, a safe, etc. The log information can help inform the owners and/or administrators how the resource is accessed. B-lock 301 can also be applied to an object which has a lock mechanism, but not a door for restricting access to the object, such as a computer or a boat. For example, b-lock 301 can be used as a lock mechanism for the computer or the boat. An owner and/or administrator of b-lock 301 can utilize mobile/web application 302 to authorize an individual to be able to lock/unlock b-lock 301 for any period of time.

Figure 4A:
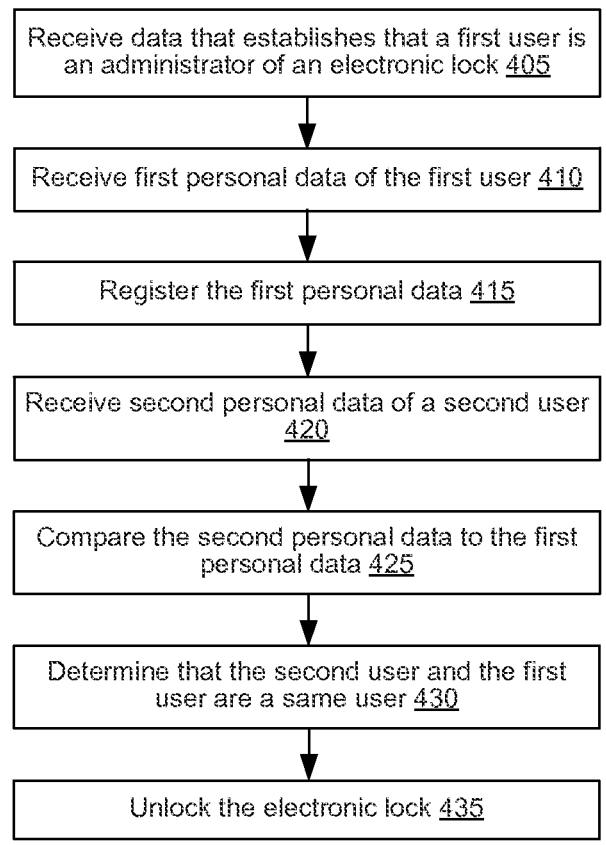
FIG. 4A is a flow diagram illustrating an example process to establish an owner or administrator of an electronic lock, consistent with various embodiments.

FIG. 4A is a flow diagram illustrating an example process to establish an owner or administrator of an electronic lock, such as b-lock 101A of FIG. 1A, b-lock 101B of FIG. 1B, b-lock 301 of FIG. 3, b-lock 601 of FIG. 6, b-lock 1100 of FIG. 11, b-lock 2001 of FIG. 20, or door management platform 2100 of FIG. 21, consistent with various embodiments. To facilitate locking or unlocking an electronic lock based on personal data, an owner or administrator of the electronic lock can be established. The electronic lock receives data that establishes that a user is an owner or administrator of the electronic lock (step 405). For example, b-lock 301 can receive the data via wireless transmitter/receiver 303. Any of a variety of methods can be utilized to establish that a user is an owner or administrator of an electronic lock. In a first example, a security code that is unique to a particular electronic lock is delivered to a user in association with a purchase of the electronic lock by the user, such as via product packaging or via registering the electronic lock at a website. When the security key is delivered via product packaging, the user, for example, obtains a document from the package that contains the security key. When the security key is delivered via a website, the user inputs a string, such as an alphanumeric string that contains the serial number of the electronic lock, at the website, such as by use of a desktop computer. The website can display the security key or send the security key to the user, such as via email or text message.

Once the user has the security key, the user can use the security key to establish that he is an owner or administrator of the electronic lock in any of several ways. For example, the user can download from a website and install on a mobile device an electronic lock application, which is an application associated with an electronic lock. A mobile device, such as mobile device 102A or 102B, can download and install an electronic lock application, such as mobile/web application 302. The user can launch the electronic lock application, and can input the security code via the electronic lock application. In some embodiments, when the electronic lock application is installed on the mobile device, the electronic lock application includes a security key.

The electronic lock application can communicate with the electronic lock either wirelessly or via a wired connection, and can send the security key to the electronic lock. For example, mobile device 102A of FIG. 1A or 102B of FIG. 1B can send the security key to b-lock 301 of FIG. 3 via a wireless or wired connection with wireless transmitter/receiver 303. The security key can be sent via an encrypted message, and b-lock 301, such as via microcontroller 304, can unencrypt the message to obtain the unencrypted security key. B-lock 301 can include non-volatile storage, such as a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of non-volatile storage. B-lock 301, such as via microcontroller 304, can access security key related data from the non-volatile storage, and can use the security key related data to verify that the security key is valid for b-lock 301. Upon validation of the security key, b-lock 301 establishes that the user is an administrator or owner of b-lock 301.

As another example of using the security key to establish that a user is an owner or administrator of an electronic lock, such as b-lock 301, the security key can be input at b-lock 301. B-lock 301 can include an input mechanism, such as a keypad, a touchpad, a microphone and associated voice recognition, or other input capability, and the user can input the security key using the input mechanism, which can be sent to microcontroller 304. B-lock 301, such as via microcontroller 304, can access security key related data from non-volatile storage, and can use the security key related data to verify that the security key is valid for b-lock 301. Upon validation of the security key, b-lock 301 establishes that the user is an administrator or owner of b-lock 301.

A second example of a method to establish that a user is an administrator of an electronic lock uses a physical key that is keyed to a particular electronic lock. The user can use the physical key to establish that he is an owner or administrator of the electronic lock by using the key to unlock, for example, b-lock 301. Microcontroller 304 determines that b-lock 301 has been unlocked by use of a physical key, and, accordingly, establishes that the user is an administrator or owner of b-lock 301.

Once an electronic lock establishes that a user is an administrator or owner of the electronic lock, the personal data of the user is registered. The personal data can be obtained in any of various ways. In embodiments where an electronic lock, such as b-lock 301, includes a personal data device, such as biometric data device 307, the personal data device can be used to obtain personal data of the user, such as biometric data of the user, a password of pass phrase for the user, a voice sample of the user. etc. In some embodiments, such as the embodiment of FIG. 6, a personal data device of or coupled to a mobile device, such as biometric data device 607A or 607B, which can be integrated in or coupled to a mobile device that is executing, respectively, mobile/web application 602A or 602B, can be used to obtain personal data of the user. An electronic lock, such as b-lock 301, can receive the personal data of the user (step 410), and can register the personal data (step 415). Registering personal data includes storing the data or a representation of the data in memory, such as non-volatile storage, and associating the personal data with a role or permission related to b-lock 301. For example, b-lock 301 can receive fingerprint data of a user who has been established to be an administrator or owner of b-lock 301. B-lock 301 can store the personal data in memory, and can associate the personal data with an owner role, an administrator role, with b-lock related permissions, etc. An owner or administrator can be, for example, authorized to unlock or lock b-lock 301 at any time.

At a later point in time, a second user attempts to unlock b-lock 301. The second user uses a personal data device to obtain second personal data, which in this example is the second user's biometric data. The second user uses a personal data device, for example, biometric data device 307 or a biometric data device of or coupled to a mobile device of the second user, to obtain second personal data. Biometric data device 307 or the mobile device of the second user send the personal data to b-lock 301, where the personal data is received (step 420). At step 425, b-lock 301, such as via microcontroller 304, compares the second personal data to the personal data of step 415 to determine whether the second user is an owner or administrator of b-lock 301. At step 430, b-lock 301 determines that the second user and the user of step 405 are a same user, and accordingly also determines that the second user is an owner or administrator of b-lock 301. Based on the validation that the second user is an owner or administrator of b-lock 301, b-lock 301 unlocks the locking mechanism of physical lock 308 (step 435), such as by microcontroller 304 sending a signal to mechanical motor 306 to cause mechanical motor 306 to unlock b-lock 301. A locking mechanism is an assembly of moving parts that enables a door, gate, lid, drawer, or the like in which the locking mechanism is installed to be secured in a closed position. In some embodiments, a locking mechanism consists of a bolt or series of bolts propelled and withdrawn by an assembly of moving parts. In some embodiments, a motor moves parts of a locking mechanism to propel or withdraw a bolt or series of bolts in order to secure or unsecure a door, gate, lid, drawer, or the like in which the locking mechanism is installed.

Figure 4B:
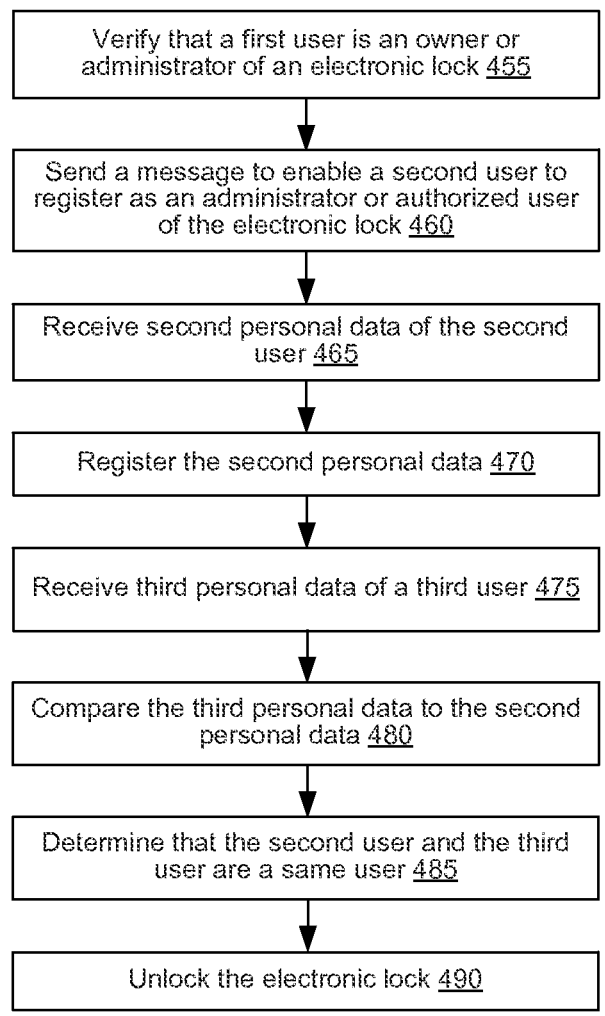
FIG. 4B is a flow diagram illustrating an example process to add an administrator or an authorized user of an electronic lock, consistent with various embodiments.

FIG. 4B is a flow diagram illustrating an example process to add an administrator or an authorized user of an electronic lock, such as b-lock 101A of FIG. 1A, b-lock 101B of FIG. 1B, b-lock 301 of FIG. 3, b-lock 601 of FIG. 6, b-lock 1100 of FIG. 11, b-lock 2001 of FIG. 20, or door management platform 2100 of FIG. 21, consistent with various embodiments. To facilitate adding an administrator or an authorized user of an electronic lock, the electronic lock can initially have an owner or administrator established, such as via the process of FIG. 4A. The owner or administrator can authorize an addition of an authorized user or an additional administrator.

An electronic lock, such as b-lock 301 of FIG. 3, verifies that a user is an owner or administrator of the electronic lock (step 455). This verification can be accomplished in any of various ways. For example, when the user is established to be an administrator or owner of the electronic lock, such as at step 405 of FIG. 4A, b-lock 301 of FIG. 3, or another device, can send first security data to a mobile device of the user to enable the mobile device to be identifiable. Messages sent by the mobile device to b-lock 301 can include second security data that enables b-lock 301 to verify that the message is from the mobile device of the user. The second security data can be verified to be the same as, derived from, associated with, etc., the first security data. Once the identity of the mobile device is established via validation of the second security data, and the second security data is validated to be associated with an owner or administrator of the electronic lock, any messages sent from the mobile device can be validated as being from an owner or administrator of the electronic lock.

Once the user is validated to be an owner or administrator of b-lock 301, the user can initiate a process to add a new administrator or authorized user. An administrator is able to manage an electronic lock, for example, by adding or deleting authorized users or other administrators. In some embodiments, only an owner can change roles/permissions of an administrator, such as adding a new administrator or deleting an existing administrator. The user can enable a second user to register as an administrator or an authorized user of b-lock 301 by causing b-lock 301 or mobile/web application 302 to send a message to the second user. For example, the user can use an electronic lock application running on his mobile device to add a second user. The user can enter any of the email address, mobile phone number, etc. of the second user, and the electronic lock application can send a message that includes a security key to the second user via email, text, etc. The security key can be recognized by b-lock 301 as granting administrator or authorized user permissions to the second user. The second user, such as by running an electronic lock application that has access to the security key on his mobile device, or by logging into a website into which the security key can be input, can cause the security key to be sent to b-lock 301. B-lock 301 can validate the security key and, based on the security key, determine that the second user has administrator or authorized used permissions.

At step 465, which is similar to step 410 of FIG. 1A, b-lock 301 receives the personal data of the second user, and registers the personal data (step 470, which is similar to step 415). At a later point in time, a third user attempts to unlock b-lock 301. The third user uses a personal data device to obtain third personal data, which in this example is the third user's biometric data. The third user uses biometric data device 307, or a biometric data device of or coupled to a mobile device of the third user, to obtain third personal data. Biometric data device 307 or the mobile device send the personal data to b-lock 301, where the personal data is received (step 475, which is similar to step 420). At step 480, which is similar to step 425, b-lock 301, such as via microcontroller 304, compares the third personal data to the personal data of step 470 to determine whether the second user is an administrator or authorized user of b-lock 301. At step 485, which is similar to step 430, b-lock 301 determines that the third user and the user of step 470 are the same user. Based on the validation that the third user is an administrator or authorized user of b-lock 301, b-lock 301 unlocks the locking mechanism of physical lock 308 (step 490, which is similar to step 435).

Figure 5:
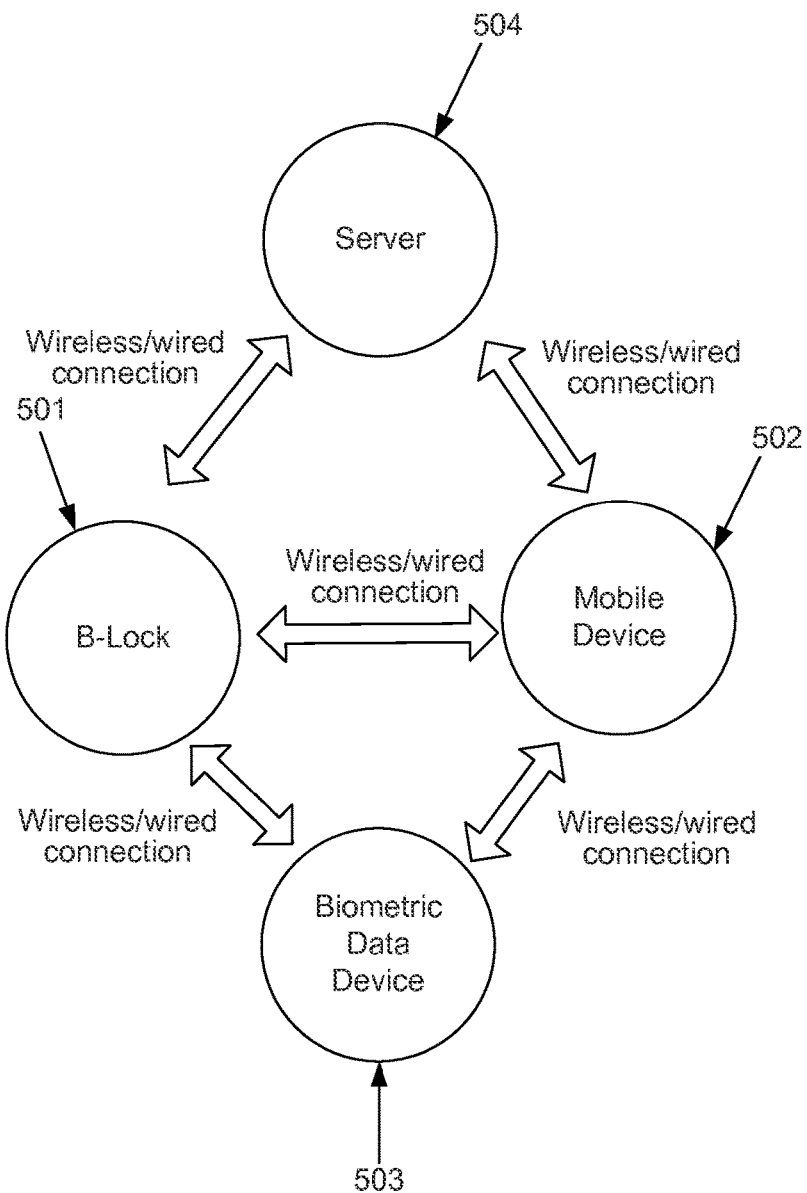
FIG. 5 is a system diagram illustrating a platform that includes a b-lock, a biometric data device, a mobile device, and a server, consistent with various embodiments.

FIG. 5 is a system diagram illustrating a platform that includes a b-lock, a biometric data device, a mobile device, and a server, consistent with various embodiments. B-lock 501 can be, e.g., b-lock 101A of FIG. 1A, b-lock 101B of FIG. 1B, b-lock 301 of FIG. 3, b-lock 601 of FIG. 6, b-lock 1100 of FIG. 11, b-lock 2001 of FIG. 20, door management platform 2100 of FIG. 21, etc. Mobile device 502 can be, e.g., mobile device 102A of FIG. 1A, mobile device 102B of FIG. 1B, a mobile device executing mobile/web application 602A or 602B, etc. Biometric data device 503 can be, e.g., biometric data device 105A of FIG. 1A, a biometric data device of or coupled to mobile device 102B, biometric data device 307 of FIG. 3, biometric data device 607A, 607B, or 607C of FIG. 6, fingerprint scanner 1305 of FIG. 13, etc. Server 504 can be, e.g., server 609 of FIG. 6, server 2009 of FIG. 20, etc. The platform of FIG. 5 can be used, for example, to manage access to physical (e.g., house, office, car, etc.) or virtual (e.g., bank account, website, etc.) properties based on biometric data. The platform can use biometric data to eliminate the need for users to carry, for example, physical keys, account specific authentication tokens, etc.

FIG. 6 is a block diagram illustrating an embodiment of an electronic lock that communicates with a server, consistent with various embodiments. The electronic lock of the embodiment of FIG. 6 is b-lock 601. B-lock 601, wireless transmitter/receiver 603, microcontroller 604, power source 605, mechanical motor 606, and physical lock 608 are, respectively, substantially similar to b-lock 301, wireless transmitter/receiver 303, microcontroller 304, power source 305, mechanical motor 306, and physical lock 308 of FIG. 3. In some embodiments, b-lock 601 includes a biometric data device, such as biometric data device 607C, while in other embodiments, b-lock 601 does not include a biometric data device. In some embodiments, regardless as to whether a b-lock includes a biometric data device, biometric data of a user can be obtained by a remote device, such as a biometric data device that is part of or coupled to a mobile device.

For example, in some embodiments, regardless as to whether b-lock 601 includes biometric data device 607C, biometric data of a user can be obtained by biometric data device 607A or 607B that is part of or coupled to, respectively, a first mobile device that is executing mobile/web application 602A or a second mobile device that is executing mobile/web application 602B. Either mobile/web application 602A or 602B can send the biometric data to b-lock 601. For example, mobile/web application 602A or 602B can send the biometric data to wireless transmitter/receiver 603, which can relay the biometric data to microcontroller 604. Further, b-lock 601 can communicate with server 609 via wireless transmitter/receiver 603.

In some embodiments, server 609 is a cloud server. For example, server 609 can be a server that is a shared cloud computing resource. In some embodiments, server 609, or any computing device that can communicate with other computing devices via a network, can store data using cloud storage. For example, server 609 can store data using storage that is part of a shared could computing resource.

Figure 7A:
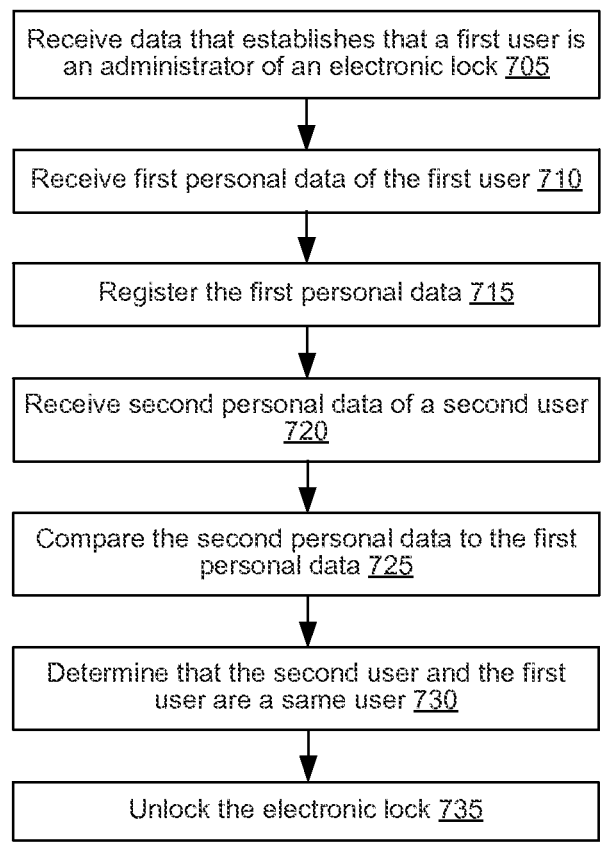
FIG. 7A is a flow diagram illustrating an example process, that involves a server, to establish an owner or administrator of an electronic lock, consistent with various embodiments.

FIG. 7A is a flow diagram illustrating an example process, that involves a server, to establish an owner or administrator of an electronic lock, consistent with various embodiments. The electronic lock of the embodiment of FIG. 7A is a b-lock, such as b-lock 101A of FIG. 1A, b-lock 101B of FIG. 1B, b-lock 301 of FIG. 3, b-lock 601 of FIG. 6, b-lock 1100 of FIG. 11, b-lock 2001 of FIG. 20, or door management platform 2100 of FIG. 21. To facilitate locking or unlocking an electronic lock based on personal data, an owner or administrator of the electronic lock can be established. A server, such as server 609 or server 2009, receives data that establishes that a user is an administrator of the electronic lock (step 705). As is discussed above in the description of FIG. 4A, any of a variety of methods can be utilized to establish that a user is an administrator of an electronic lock, and to enable the user to obtain a security key for the electronic lock.

As is discussed above in the description of FIG. 4A, once the user has the security key, the user can use the security key to establish that he is an owner or administrator of the electronic lock in any of several ways. For example, the user can download from a website and install on a mobile device an electronic lock application. A mobile device, such as mobile device 102A or 102B, can download and install mobile/web application 602A, which can be an electronic lock application. The user can launch the electronic lock application, and can input the security code via the electronic lock application. The electronic lock application can communicate with the server either wirelessly or via a wired connection, and can send the security key to the server. For example, mobile device 102A of FIG. 1A or 102B of FIG. 1B can send the security key to server 609. Server 609 can include non-volatile storage, such as a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of non-volatile storage. Server 609 can access security key related data from the non-volatile storage, and can use the security key related data to verify that the received security key is valid for b-lock 601. Upon validation of the security key, server 609 establishes that the user is an administrator or owner of b-lock 601.

Once a server establishes that a user is an administrator or owner of an electronic lock, the personal data of the user is registered. As is discussed above in the description of FIG. 4A, the personal data can be obtained in any of various ways. In the embodiment of FIG. 7A, the user uses biometric data device 607A, which is part of or coupled to a mobile device that is running mobile/web application 602A, to obtain personal data of the user. Server 609 can receive the personal data of the user (step 710), and can register the personal data (step 715). Registering personal data includes storing the data or a representation of the data in memory, such as non-volatile storage, and associating the personal data with a role or permission related to b-lock 601. For example, server 609 can receive fingerprint data of a user who has been established to be an administrator or owner of b-lock 601. Server 609 can store the personal data in memory, and can associate the personal data with an owner or administrator role, can associate the personal data with b-lock 601 related permissions, etc.

At a later point in time, a second user attempts to unlock b-lock 601. The second user uses a personal data device to obtain second personal data, which in this example is the second user's biometric data. The second user uses, for example, biometric data device 607B, which is part of or coupled to a mobile device executing mobile/web application 602B, to obtain the second personal data. Biometric data device 607B sends the second personal data to mobile/web application 602B, which in turn sends the personal data to server 609, where the personal data is received (step 720). At step 725, server 609 compares the second personal data to the personal data of step 715 to determine whether the second user is an owner or administrator of b-lock 601. At step 730, server 609 determines that the second user and the user of step 705 are a same user, and accordingly also determines that the second user is an owner or administrator of b-lock 601. Based on the validation that the second user is an owner or administrator of b-lock 601, which can be communicated to b-lock 601 by server 609 when server 609 accomplishes the validation, b-lock 601 unlocks the locking mechanism of physical lock 608 (step 735), such as by microcontroller 604 sending a signal to mechanical motor 606 to cause mechanical motor 606 to unlock b-lock 601.

Figure 7B:
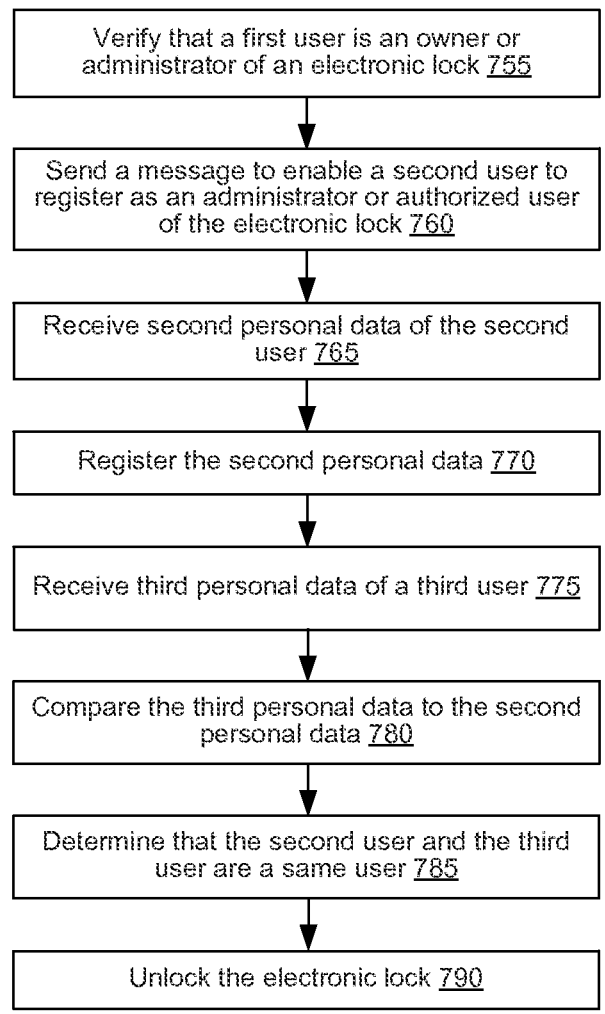
FIG. 7B is a flow diagram illustrating an example process, that includes a server, to add an administrator or an authorized user of an electronic lock, consistent with various embodiments.

FIG. 7B is a flow diagram illustrating an example process, that includes a server, to add an administrator or an authorized user of an electronic lock, consistent with various embodiments. The electronic lock of the embodiment of FIG. 7B is a b-lock, such as b-lock 101A of FIG. 1A, b-lock 101B of FIG. 1B, b-lock 301 of FIG. 3, b-lock 601 of FIG. 6, b-lock 1100 of FIG. 11, b-lock 2001 of FIG. 20, or door management platform 2100 of FIG. 21. To facilitate adding an administrator or an authorized user of an electronic lock, the electronic lock can initially have an owner or administrator established, such as via the process of FIG. 7A. The owner or administrator can authorize an addition of an authorized user or an additional administrator.

A server, such as server 609 of FIG. 6, verifies that a user is an owner or administrator of an electronic lock, such as b-lock 601 (step 755). As is discussed above in the description of FIG. 4B, this verification can be accomplished in any of various ways. For example, when the user is established to be an administrator or owner of the electronic lock, such as at step 705 of FIG. 7A, server 609 of FIG. 6 can send first security data to a mobile device of the user, such as a mobile device running mobile/web application 602A, to enable the mobile device to be uniquely identifiable. Messages sent by the mobile device to b-lock 601 or server 609 can include second security data that enables b-lock 601 or server 609 to verify that the message is from the mobile device of the user. The second security data can be the same as the first security data, can be generated based on the first security data, etc. Once the identity of the mobile device is established via validation of the second security data, and the second security data is validated to be associated with an owner or administrator of b-lock 601, any messages sent from the mobile device can be validated as being from an owner or administrator of b-lock 601.

As a second example, server 609 can have access to a list of owners and/or administrators for b-lock 601. Each user, including each owner and/or administrator, can have an account at server 609, with the user's status as an owner or administrator of b-lock 601 being available via the account profile. When the user logs into the account, server 609 can verify that the user is an owner or administrator of b-lock 601 via the user's account profile.

Once the user is validated to be an owner or administrator, the user can initiate a process to add a new administrator or authorized user. An administrator is able to manage an electronic lock, for example, by adding or deleting authorized users or other administrators. The user can enable a second user to register as an administrator or an authorized user of b-lock 601 by causing server 609 send a message to the second user. For example, the user can use an electronic lock application running on his mobile device to add a second user. The user can enter the email address, mobile phone number, etc. of the second user, and the electronic lock application can send a message that includes a security key to the second user via email, text, etc. The security key can be recognized by b-lock 601 or server 609 as granting administrator or authorized user permissions to the second user. The second user, such as by running an electronic lock application that has access to the security key on his mobile device, or by logging into a website into which the security key can be input, can cause the security key to be sent to b-lock 601 or server 609. B-lock 601 or server 609 can validate the security key and, based on the security key, recognize that the security key grants administrator or authorized used rights to the second user.

At step 765, which is similar to step 710 of FIG. 7A, server 609 can receive the personal data of the second user, and can register the personal data (step 770, which is similar to step 715). At a later time, a third user attempts to unlock b-lock 601. The third user uses a personal data device, which in this example is a biometric scanner, to obtain third personal data, which in this example is the third user's biometric data. The third user uses, for example, biometric data device 607B to obtain third personal data. Biometric data device 607B sends the third personal data to mobile/web application 602B, which in turn sends the third personal data to server 609, where the personal data is received (step 775, which is similar to step 720). At step 780, which is similar to step 725, server 609 compares the third personal data to the personal data of step 770 to determine whether the second user is an administrator or authorized user of b-lock 601. At step 785, which is similar to step 730, server 609 determines that the third user and the user of step 770 are a same user. Based on the validation that the third user is an administrator or authorized user of b-lock 601, which can be communicated to b-lock 601 by server 609 when server 609 accomplishes the validation, b-lock 601 unlocks the locking mechanism of physical lock 608 (step 790, which is similar to step 735).

Figure 8A:
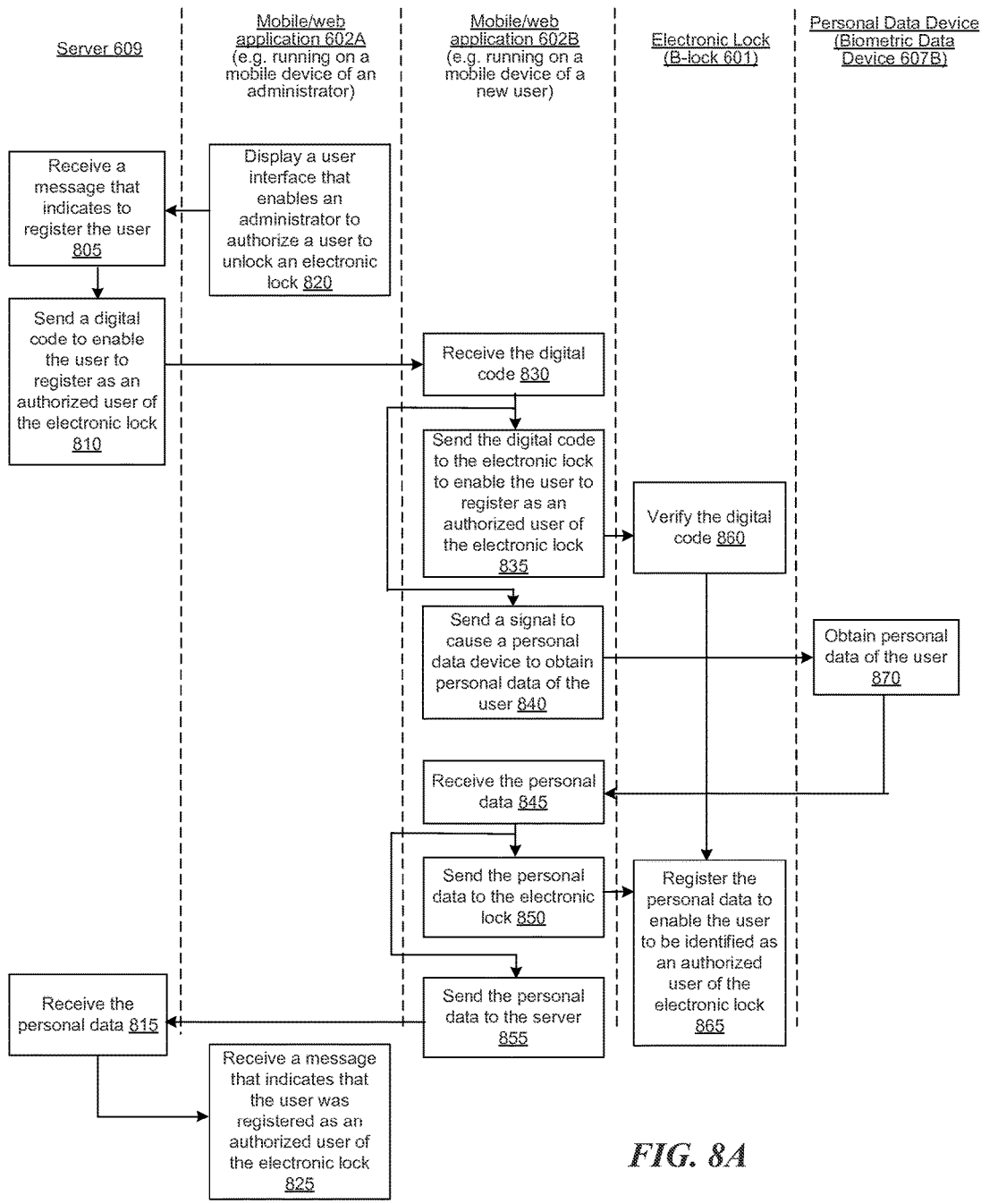
FIGS. 8A and 8B are activity diagrams each illustrating a different example process for managing access to a physical property with access controlled by an electronic lock, consistent with various embodiments.

FIG. 8A is an activity diagram illustrating an example process for managing access to a physical property with access controlled by an electronic lock, consistent with various embodiments. The electronic lock of the example of FIG. 8A is b-lock 601. The description of the example process of FIG. 8A will refer to the embodiment and labels of FIG. 6. Using, for example, the process of FIG. 7A, a user who is a purchaser of an electronic lock can register himself as an owner and/or administrator of the electronic lock. The user can download an electronic lock application, such as mobile/web application 602A, on his mobile device and can execute the electronic lock application. The electronic lock application can display a user interface that enables an administrator, such as the user, to authorize a new user to unlock an electronic lock, such as b-lock 601 (step 820). To authorize the new user to unlock the electronic lock, the new user can be registered as an authorized user. An authorized user is a user that is authorized to unlock or lock an electronic lock during one or more periods of time.

For example, an authorized user can be authorized to lock and/or unlock an electronic lock at any time, Monday through Friday from 9:00 am to 5:00 pm, on the first Monday of every month, today from 4:00 pm to 6:00 pm, at any time between noon today to noon one week from today, etc. Once registered as an authorized user, the authorized user can lock and/or unlock the electronic lock during the period(s) of time that he is authorized to lock and/or unlock the electronic lock.

Being able to grant access to a physical property without having to provide any physical item, such as a physical key, is useful to a variety of people who want to grant access to a physical property. Such an ability can be useful to, for example, a property owner who rents his house using an online lodging website, an apartment dweller who wants to enable a cleaning person to enter his house when a cleaning is scheduled, a car owner who wants to lend his car to his friend for a period of time, etc. In each of these cases, rather than having to deliver a physical key to the renter, cleaning person, or friend, the access granting person can authorize the renter, cleaning person, or friend to be able to lock and unlock the electronic lock during the desired period of time. For example, the property owner can authorize the renter to be able to lock and unlock the electronic lock on the door of the house during the period of time that the renter rents the house. The apartment dweller can authorize the cleaning person to be able to lock and unlock the electronic lock on the door of his apartment during the scheduled cleaning time. The car owner can authorize his friend to be able to lock and unlock the door of the car during the period of time that he has decided to loan the car to his friend. Another embodiment of an electronic lock can be used to enable the friend to be able to start the car during the period of time that the car owner wants to loan the car to the friend.

The user can use the user interface to manage access to a physical property or object with access controlled by an electronic lock. Using a user interface of an application, such as interface 900 of FIG. 9 which is a user interface of mobile/web application 602A, a user can manage access to physical properties, such as his home, a storage facility, his office, his car, etc. Interface 900 can be an interface to a resource management platform for managing access to shared resources. To manage access to his home, which in this example has access controlled by b-lock 601, the user can touch the "Manage" icon of user interface 900 that is associated with his home. A second level user interface is displayed to enable the user to input contact information for a new user that he wants to grant access to his home. The user can input, for example, an email address, a phone number of a mobile device, an IP address, etc. of the new user. Mobile/web application 602A sends a message that indicates a request to register the new user as an authorized user of b-lock 601 to a server, such as server 609 (step 805). The message can include contact information of the new user, as well as an indication of one or more periods of time when the new user is authorized to lock and/or unlock b-lock 601.

Server 609 verifies that the message is from an administrator of b-lock 601, and, based on the verification, sends a digital code to the new user to enable the user to register as an authorized user of b-lock 601. The digital code can include, for example, an encrypted security key. The digital code can be sent via an email to the email address of the new user, via a text message to the phone number of the new user, via a message sent to an IP address of the new user, etc. Once the digital code is received by the new user, mobile/web application 602B can obtain the digital code and can obtain the security key (step 830). The new user can be registered as an authorized user of b-lock 601 when, for example, the new user sends the security key to b-lock 601, and b-lock 601 verifies the security key.

Mobile/web application 602B sends a signal to a personal data device, such as biometric data device 607B, to cause biometric data device 607B to obtain personal data of the new user. Biometric data device 607B can be part of or coupled to a mobile device that is running mobile/web application 602B. For example, biometric data device 607B can be an integrated fingerprint scanner of a mobile device that is running mobile/web application 602B, can be a fingerprint scanner that is plugged into a connector, such as a micro-USB or Lightning connector, of a mobile device that is running mobile/web application 602B, etc. In some embodiments, the new user can use biometric data device 607A or biometric data device 607C to obtain personal data of the new user. In response to the signal, biometric data device 607B obtains personal data of the new user, such as by obtaining fingerprint data of the new user (step 870). Biometric data device 607B sends the personal data to mobile/web application 602B, where the personal data is received (step 845).

Mobile/web application 602B sends the digital code to b-lock 601 to enable the new user to register as an authorized user of b-lock 601 (step 835). B-lock 601 validates the digital code, such as by unencrypting the digital code to obtain and validate a security key (step 860). Mobile/web application 602B sends the personal data to b-lock 601 (step 850). Sending the personal data can include sending a representation of the personal data, for example, sending a digital representation of a fingerprint. After verifying the digital code and receiving the personal data, b-lock 601 registers the new user as an authorized user by storing the personal data in storage, such as non-volatile memory (step 865). Storing the personal data enables the new user to be identified as an authorized user by comparing personal data that is received in the future to the stored personal data. Mobile/web application 602B further sends information as to the period or periods when the new user is authorized to lock and/or unlock b-lock 601. B-lock 601 associates the personal data with the received period or periods when the new user is authorized to lock and/or unlock b-lock 601.

In some embodiments, mobile/web application 602B sends the personal data to server 609 (step 855), where the data is received (step 815). Server 609 sends a message to mobile/web application 602A that indicates that the new user was registered as an authorized user of b-lock 601 (step 825). In some embodiments, server 609, rather than b-lock 601, compares received personal data to stored personal data of an authorized user to determine whether the received personal data matches the stored personal data. In some embodiments, server 609 stores personal data of authorized users for one or more electronic locks. If an electronic lock breaks down and needs to be replaced, the new electronic lock can populate data for authorized users by obtaining the personal data and other associated data of the authorized users of the broken electronic lock.

In some embodiments, software updates can be pushed to a device with an application installed, such as a mobile device with mobile/web application 602A or 602B installed. Software updates can further be pushed to a computing device with an application installed, such as a desktop computer with a web application installed. Software updates can additionally be pushed to an electronic lock. For example, server 609 can cause a software update to be applied to a mobile device that is executing mobile/web application 602A, 602B, or can cause an update to be applied to b-lock 601. The software update can be sent to b-lock 601 via a network with which wireless transmitter/receiver 603 can communicate, such as a Wi-Fi network of a physical property for which b-lock 601 is being used to restrict access, or can be sent from any of mobile/web application 602A or 602B to b-lock 601, such as via wireless transmitter/receiver 603, or can be sent via any other compatible way.

Figure 8B:
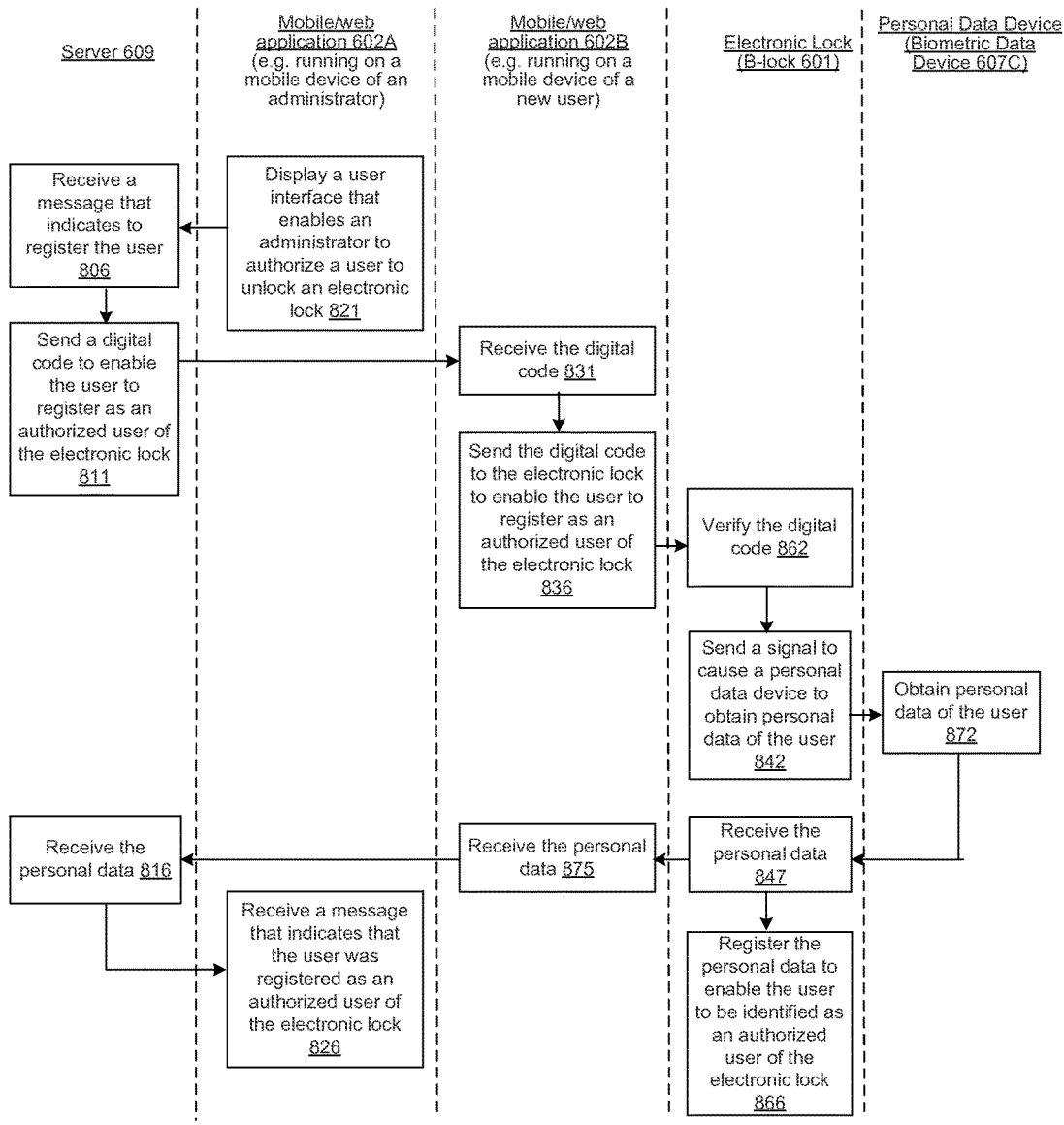

FIG. 8B is an activity diagram illustrating a second example process for managing access to a physical property with access controlled by an electronic lock, consistent with various embodiments. The electronic lock of FIG. 8B is b-lock 601. The process of FIG. 8B is similar to the process of FIG. 8A, with one point of difference being that, in some embodiments, a personal data device of an electronic lock is used to obtain personal data of a new user. The description of the example process of FIG. 8B will refer to the embodiment and labels of FIG. 6. Steps 821, 806, 811, 831, and 836 are, respectively, substantially similar to steps 820, 805, 810, 830, and 835 of FIG. 8A. At step 862, b-lock 601 validates the digital code received at step 836, such as by unencrypting the digital code to obtain a security key and validating the security key. B-lock 601 sends a signal to a personal data device, such as biometric data device 607C, to cause biometric data device 607C to obtain personal data of a new user (step 842). In response to the signal, biometric data device 607C obtains personal data of the new user, such as by obtaining fingerprint data of the new user (step 872). Biometric data device 607C sends the personal data to b-lock 601, where the personal data is received (step 847). B-lock 601 relays the personal data to mobile/web application 602B, where the personal data is received (step 875).

After verifying the digital code and receiving the personal data, b-lock 601 registers the new user as an authorized user, such as by storing the personal data in storage (step 866). Storing the personal data enables the new user to be identified as an authorized user by comparing personal data that is received in the future to the stored personal data. Mobile/web application 602B can further send to b-lock 601 information as to a period or periods when the new user is authorized to lock and/or unlock b-lock 601. B-lock 601 associates the personal data with the received period or periods when the new user is authorized to lock and/or unlock b-lock 601.

In some embodiments, mobile/web application 602B sends the personal data to server 609, where the personal data is received (step 816). Server 609 sends a message to mobile/web application 602A that indicates that the new user was registered as an authorized user of b-lock 601 (step 826).

Figure 9:
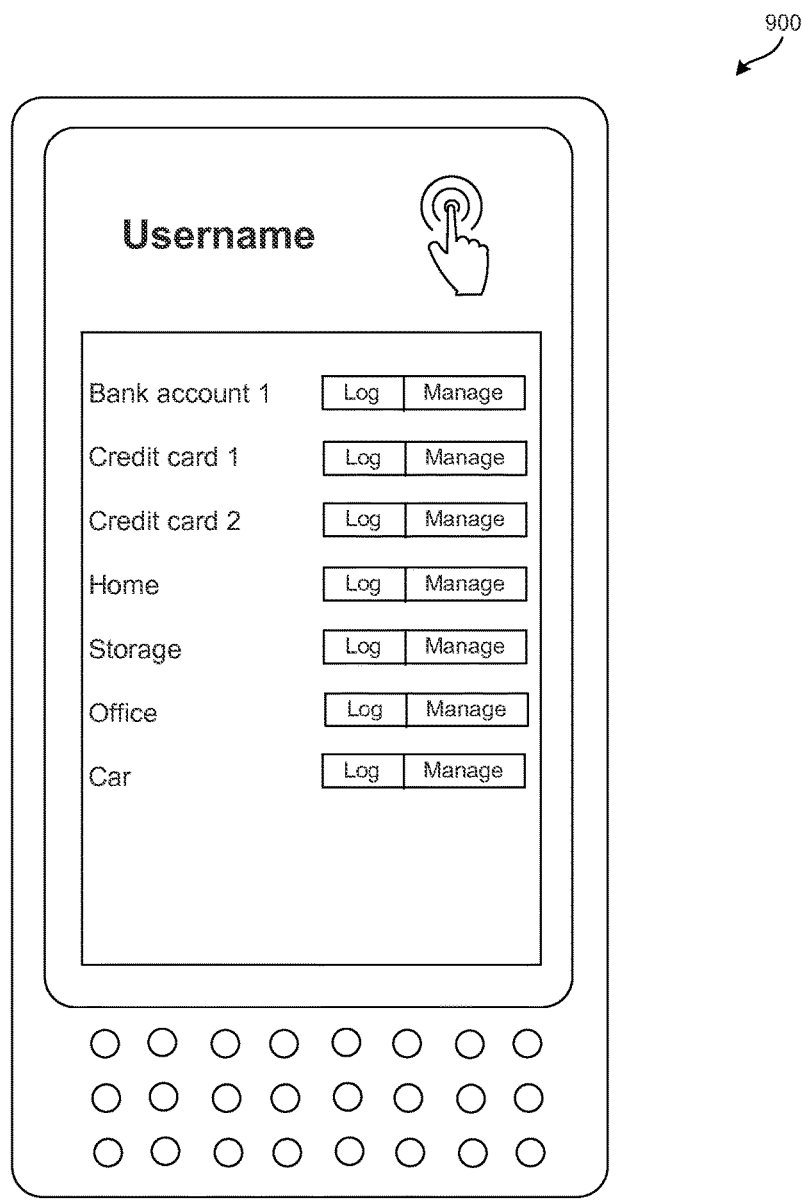
FIG. 9 is an illustration of a user interface for a resource management platform for managing access to shared resources, consistent with various embodiments.

FIG. 9 is an illustration of a user interface for a resource management platform for managing access to shared resources, consistent with various embodiments. As discussed above, in some embodiments, a resource management platform is used to manage access to physical resources, such as homes, offices, cars, etc., that use an electronic lock to restrict access to the physical resource. In some embodiments, a resource management platform is used to manage access to virtual resources, and in other embodiments, to manage access to both physical resources and virtual resources. A virtual resource can be, for example, a bank account, a credit union account, a checking account, a payment card account (e.g., a credit card account, a debit card account, an automated teller machine (ATM) card account, a gift card account, a stored value card account, etc.), a credit account, etc.

A user can create a profile at the resource management platform, can identify each virtual resource that he desires to share with another person, and can input information that enables the platform to access each virtual resource, such as a login ID and password for each virtual resource. The user can use interface 900 of the resource management platform to manage access to, for example, his home, which in this example has access controlled by an electronic lock, and his credit card account. The user can touch the "Manage" icon of user interface 900 that is associated with a virtual resource, such as his credit card account.

A second level of user interface can be displayed, and the user can identify a new user with whom he wants to share the virtual resource. The user can provide contact information for the new user, such as an email address of the new user, or a phone number or IP address of a computing device of the new user, such as a mobile device of the new user, etc. The resource management platform can send a message to the new user to enable the new user to register with the resource management platform.

The new user can use, for example, his mobile device to obtain personal data, such as biometric data of a biometrically identifiable part of his body, and can send the personal data to the resource management platform, where the platform can store the personal data for future validation of the new user. The user can further identify the resource that he is going to share with the new user, and any access restrictions, such as one or more periods of time that the new user is authorized to utilize the shared resource, or restrictions on his access to the virtual resource, such as being limited to withdraw a maximum amount each day from the user's checking account, or being limited to charge a maximum amount each day using a payment account of the user.

When the new user attempts to access a virtual resource that the user shared with the new user, the resource management platform can send a message to the new user's mobile device that prompts the mobile device to obtain personal data of the new user. The resource management platform can obtain and validate the personal data of the new user. Based on this validation, the resource management platform can use, for example, the stored login ID and password of the virtual resource that the user shared with the new user to enable the new user to obtain access to the virtual resource.

Figure 10A:
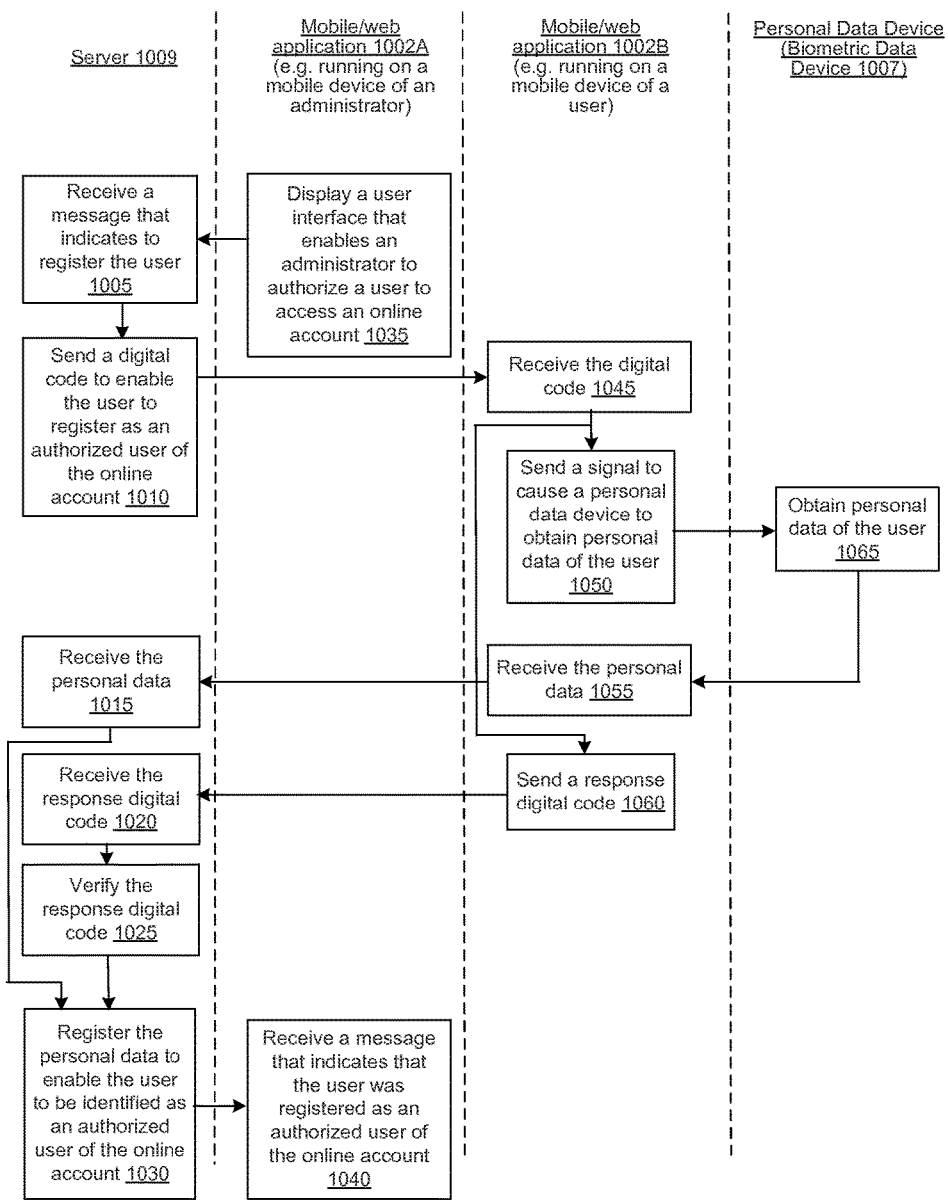
FIGS. 10A and 10B are activity diagrams illustrating an example process for managing and enabling access to a virtual resource, consistent with various embodiments.

FIG. 10A is an activity diagram illustrating an example process for managing access to a virtual resource, consistent with various embodiments. Steps 1035, 1005, 1010, 1045, 1050, 1065, 1055, and 1015 are, respectively, substantially similar to steps 820, 805, 810, 830, 840, 870, 845, and 815 of FIG. 8A, with one point of difference being that the steps of FIG. 10A that are related to authorizing a user to access an online account are, in the associated step of FIG. 8, related to authorizing a user to access an electronic lock. In some embodiments, server 1009, mobile/web application 1002A, mobile/web application 1002B, and biometric data device 1007 are, respectively, server 609, mobile/web application 602A, mobile/web application 602B, and biometric data device 607B of FIG. 6.

At step 1060, mobile/web application 1002B sends a response digital code to server 1009. In some embodiments, the response digital code is the same as the digital code received at step 1045. In other embodiments, the response digital code is a security code generated by mobile/web application 1002B based on the digital code received at step 1045. When generated based on the digital code received at step 1045, the response digital code can be verified, such as by server 1009, to be a security code that was generated based the digital code received at step 1045. Mobile/web application 1002B sends the response digital code to server 1009 (step 1060), where the response digital code is received (step 1020). Server 1009 verifies the response digital code (step 1025), such as by verifying that the response digital code is the same as the digital code that was sent to mobile/web application 1002B at step 1010, by verifying that that the response digital code was generated based on the digital code that was sent to mobile/web application 1002B at step 1010, etc.

Upon receipt of the personal data of step 1015, and based on the verification of step 1025 of the response digital code, server 1009 registers the personal data to enable the user to be identified as an authorized user of the online account (step 1030). The personal data can be registered, for example, by storing the personal data in storage that can be accessed by server 1009, and associating the personal data with the user. Registering the personal data enables the user to be identified as an authorized user by comparing personal data that is received in the future to the registered personal data. Server 1009 sends a message that indicates that the user was registered as an authorized user of the online account to mobile/web application 1002A, where the message is received (step 1040).

Figure 10B:
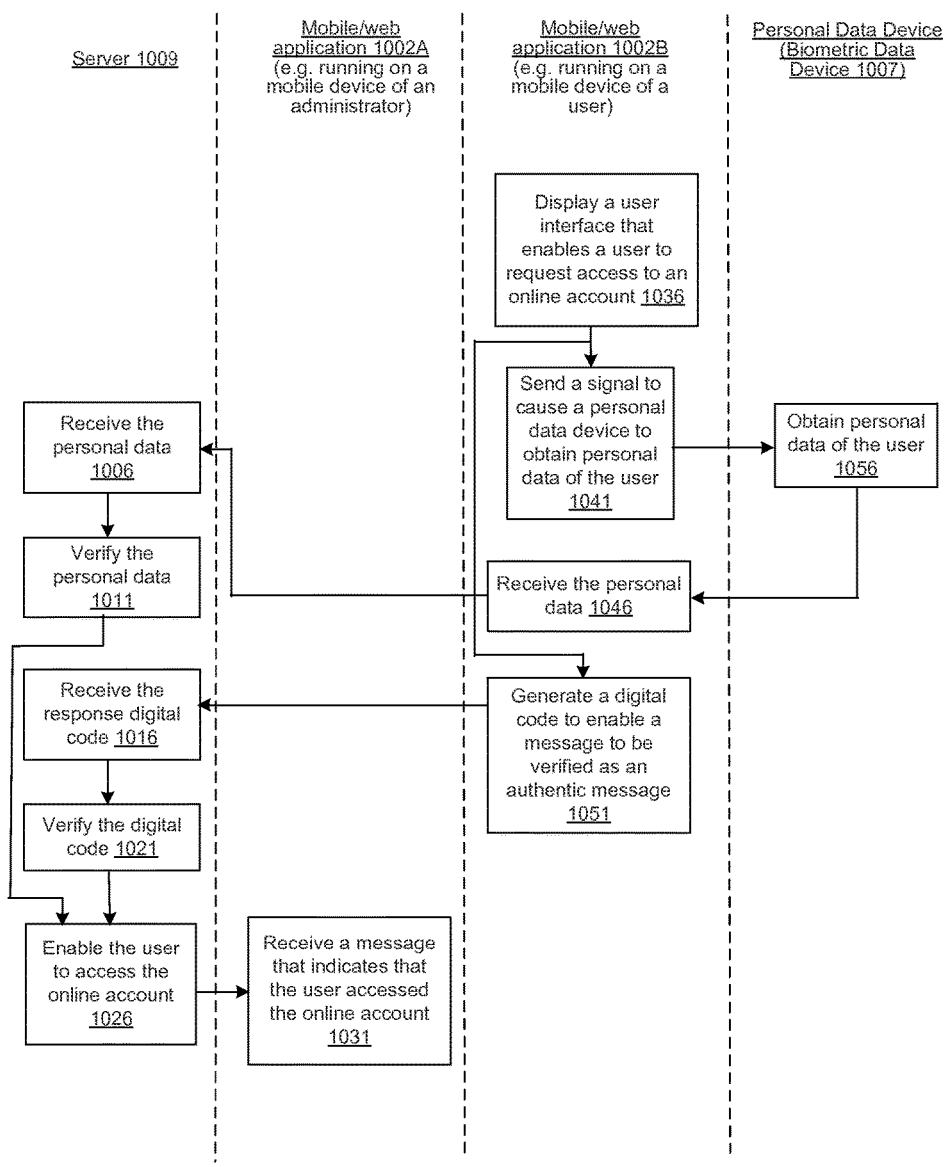

FIG. 10B is an activity diagram illustrating an example process for enabling access to a virtual resource, consistent with various embodiments. Steps 1041, 1056, 1046, and 1006 are, respectively, substantially similar to steps 1050, 1065, 1055, and 1015 of FIG. 10A. At step 1036, mobile/web application 1002B displays a user interface that enables a user to request access to a shared online account, such as an online account of another person. The user can identify a particular online account in any of various ways. For example, the user can indicate the online account he wants to access by selecting a particular online account from a list of online accounts for which he has registered as an authorized user. As a second example, the user can input identifying information for the account, such as a website and user name that can be used to access the account.

Mobile/web application 1002B generates a digital code (step 1051). The digital code can enable a message, such as a message that indicates a request to access an online account, to be verified as being authentic. The digital code of step 1051 can be generated based on, e.g., the digital code received at step 1045. Mobile/web application 1002B sends the digital code to server 1009, where the digital code is received (step 1016). At step 1011, server 1009 verifies the personal data received at step 1006. The personal data can be verified by comparing the personal data against reference personal data for the user, such as by comparing the personal data to personal data that was stored in association with step 1030. At step 1021, server 1009 verifies the digital code received at step 1016.

Upon verification of the personal data and the digital code, server 1009 enables the user to access the online account (step 1026). For example, server 1009 can act as an intermediary between mobile/web application 1002B and a server that hosts the online account, for example, an online account server. Server 1009 can use the online account owner's login ID and password to login to the online account server. The user, via mobile/web application 1002B, can request certain actions for the online account, such as obtaining an account balance, transferring money between the online account and an account of the user, etc. Server 1009, acting as an intermediary, can cause the requested actions to happen and can report the result of the action back to mobile/web application 1002B. Server 1009 can send a message to mobile/web application 1002A to notify the administrator of the online account that the user accessed the online account (step 1031).

Figure 15:
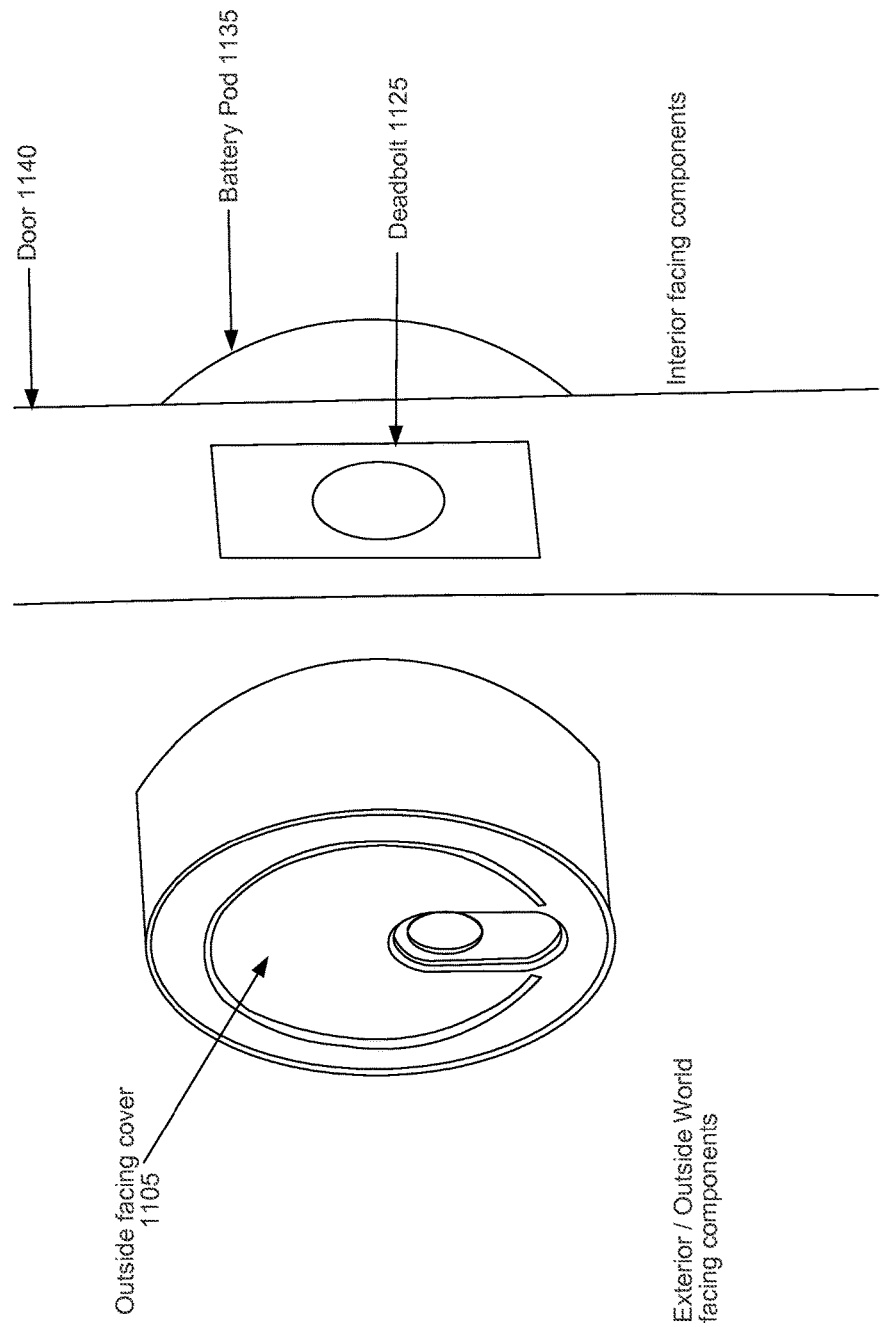
FIG. 15 is an illustration of an angled view of an electronic lock that shows both exterior facing and interior facing portions of the b-lock, consistent with various embodiments.

FIG. 11 is an exploded view illustrating the relationship of various components of an electronic lock, consistent with various embodiments. The electronic lock of the embodiment of FIG. 11 is a b-lock. B-lock 1100, which in the example of FIG. 11 is mounted in door 1140, includes outside facing cover 1105, circuit board housing 1110, sensors 1115, motor assembly 1120, deadbolt 1125, rotating base 1130, and battery pod 1135. B-lock 1100 can be used to lock, for example, an exterior door of a house. As is illustrated in FIG. 15, the components on one side of door 1140, such as outside facing cover 1105, face the outside world. The components on the other side of door 1140, such as battery pod 1135, face the interior of the house.

Figure 12:
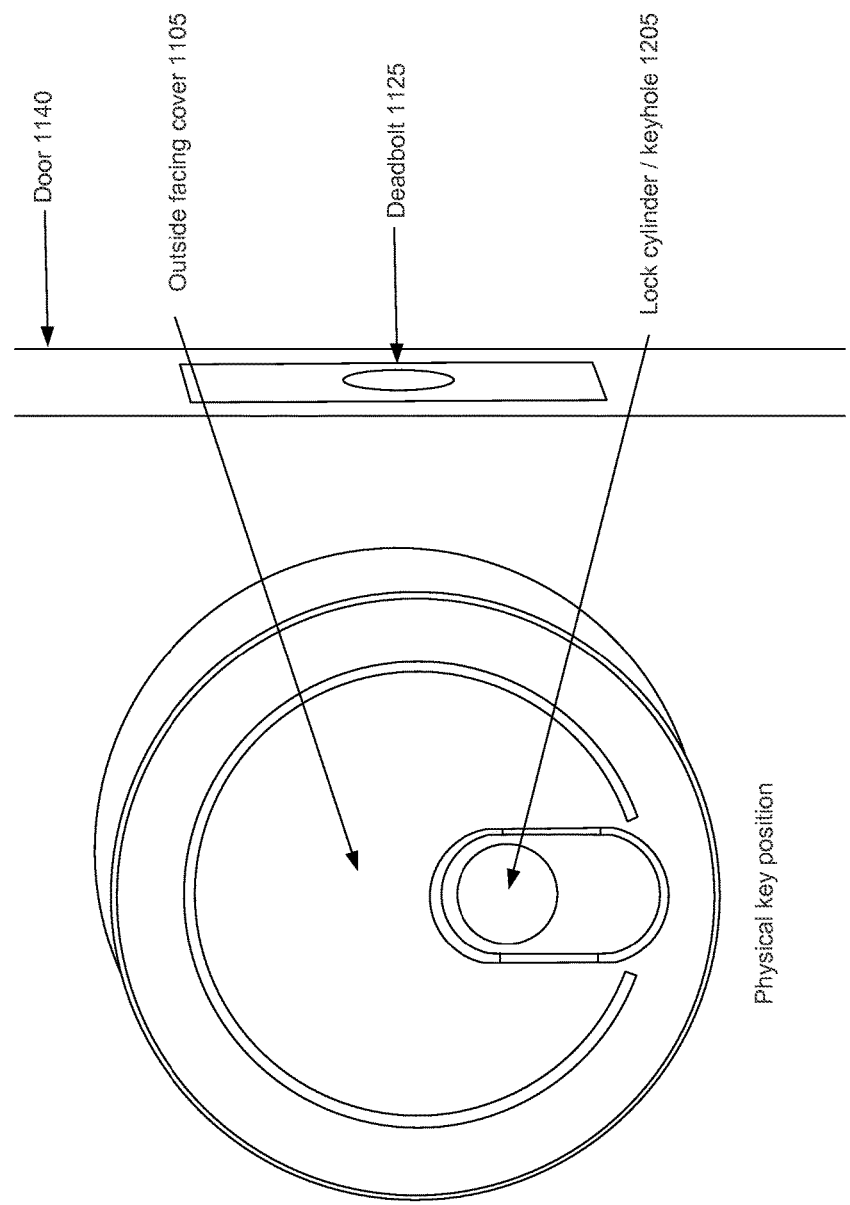
FIG. 12 is an illustration of a front view of an electronic lock with a rotating cover with the cover positioned to expose a keyhole, consistent with various embodiments.
Figure 13:
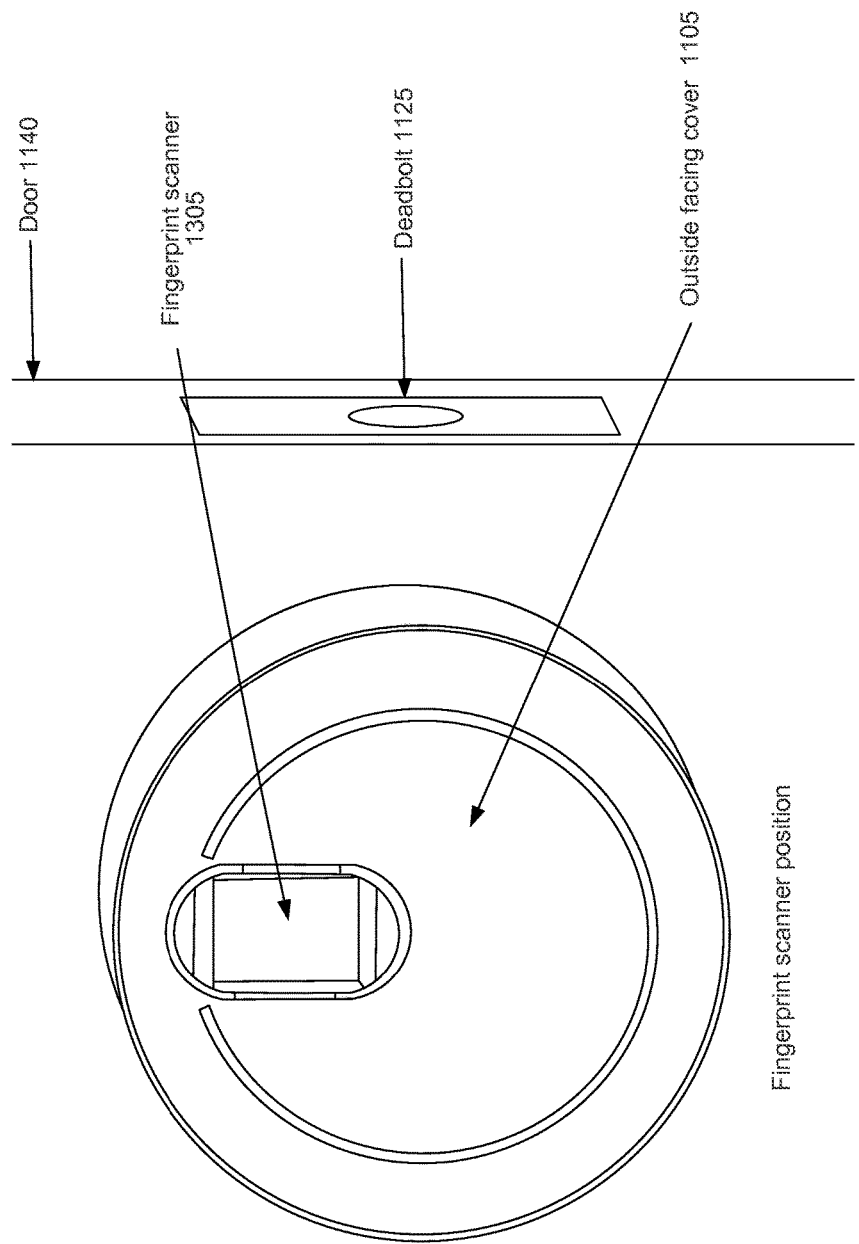
FIG. 13 is an illustration of a front view of an electronic lock with a rotating cover with the cover positioned to expose a fingerprint scanner, consistent with various embodiments.
Figure 14:
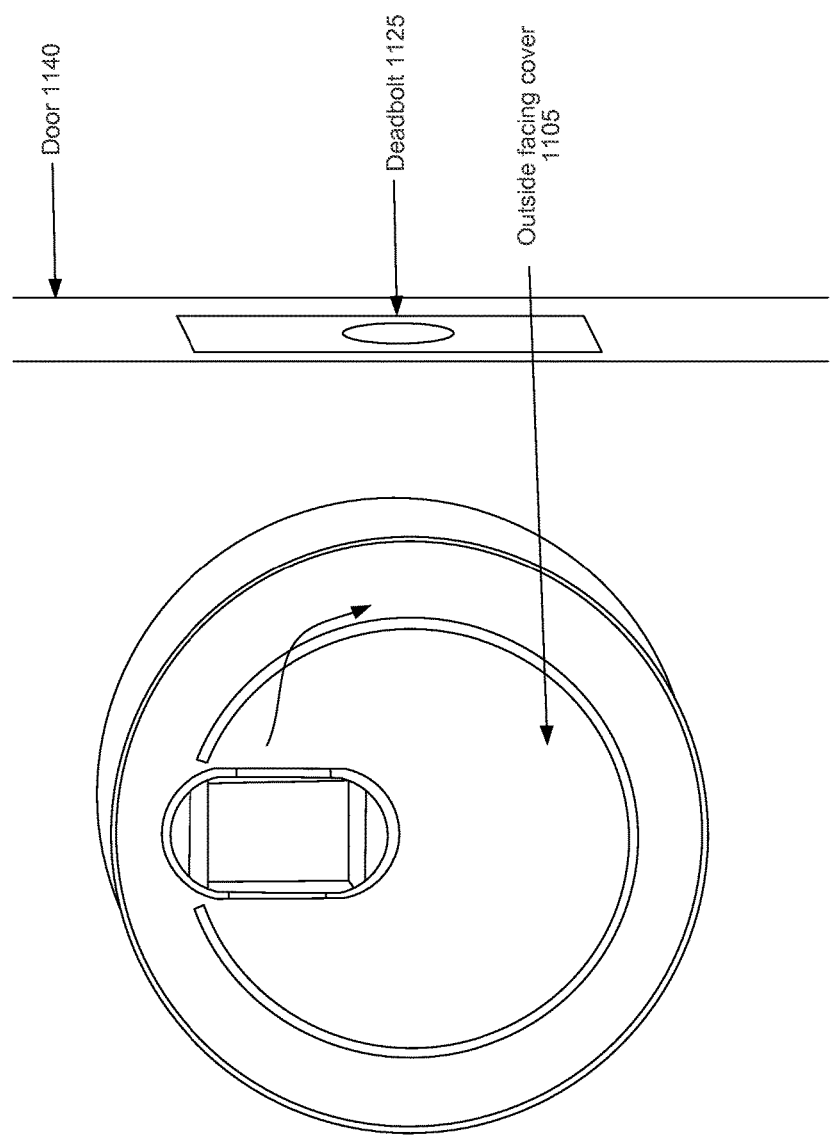
FIG. 14 is an illustration of a front view of an electronic lock with a rotating cover, consistent with various embodiments.

As is shown in FIG. 14, outside facing cover 1105 can be rotated. For example, as is illustrated in FIG. 12, outside facing cover 1105 can be rotated to a first position that exposes lock cylinder/keyhole 1205. While in the first position, a user can insert a physical key into lock cylinder/keyhole 1205, and can turn the key in a first direction to extend deadbolt 1125 and lock door 1140, or can turn the key in a second direction to retract deadbolt 1125 and unlock door 1140.

The user can further rotate outside facing cover 1105 to expose one or more other components of b-lock 1100. For example, in FIG. 13 the user has rotated outside facing cover 1105 to a second position that exposes fingerprint scanner 1305. Fingerprint scanner 1305 is a device that can obtain personal data, such as a user's fingerprint data, that can be used to identify a finger of a user. While in this second position, the user can place his finger on fingerprint scanner 1305. B-lock 1100, such as via fingerprint scanner 1305, can obtain the user's fingerprint data. If b-lock 1100 verifies that the user's fingerprint data matches fingerprint data of an authorized user of b-lock 1100, b-lock 1100 can determine, such as via a processor coupled to circuit board housing 1110, to lock or unlock b-lock 1100.

In various embodiments, outside facing cover 1105 can be rotated to expose any of various components. For example, outside facing cover 1105 can be rotated to expose a charging port (not pictured). The charging port can be any of various types of connectors. For example, the charging port can be compatible with an industry standard connector, such as a USB connector, a micro-usb connector, a Lightning connector, etc., can be a custom or proprietary connector, can be a puzzle connector, etc. The charging port can be used to charge a battery of b-lock 1100. For example, in a situation where the user does not have a physical key that he can insert in lock cylinder/keyhole 1205 to unlock b-lock 1100, the user may need to rely upon being able to unlock b-lock 1100 based on a biometric scan of his finger. If a battery of b-lock 1100 were discharged, the user may not be able to unlock b-lock 1100 using his finger. For example, if battery 1905 of FIG. 19 were discharged, motor assembly 1120 may not be able to obtain enough power from battery 1905 to provide sufficient mechanical force to move deadbolt 1125.

In a situation where b-lock 1100 is not able to unlock door 1140 due to battery 1905 being discharged, the user can rotate outside facing cover 1105 to expose a charging port, for example, a micro-usb port that can be used to charge battery 1905 and/or to substantially immediately power b-lock 1100. The user can use, e.g., a micro-usb cable connected to a power source to recharge battery 1905 and/or to substantially immediately power b-lock 1100. The user can connect the USB connector of the micro-usb cable to a power source, such as a USB port of a laptop computer, a USB port of a portable battery pack, etc. The user can connect the micro-usb connector of the micro-usb cable to the exposed micro-usb port of b-lock 1100. Once the connections are made, electrical current can flow from the power source to battery 1905 and can recharge battery 1905, and/or can flow to the various components of b-lock 1100, such as to the components inside circuit board housing 1110, to the components of sensors 1115, and to the components of motor assembly 1120.

In embodiments where the charging port immediately or substantially immediately powers b-lock 1100, the user can immediately or substantially immediately use his finger to cause b-lock 1100 to unlock door 1140. In embodiments where the charging port can be used to charge battery 1905, but not to additionally power b-lock 1100, once battery 1905 is sufficiently recharged, the user can use his finger to cause b-lock 1100 to unlock door 1140.

In some embodiments, the charging port has only a direct connection to the charging circuits and there is no data connection to the digital components of b-lock 1100, such as to microcontroller 304, 604, or 2004. By isolating the charging port from the data connections of digital components of b-lock 1100, security is increased by isolating the digital components and associated software from tampering via the charging port.

Circuit board housing 1110 is a housing that includes a circuit board, such as a circuit board that includes a processing system of b-lock 1100. The processing system can include, for example, micro-controller 304 and wireless transmitter/receiver 303 of FIG. 3, micro-controller 604 and wireless transmitter/receiver 603 of FIG. 6, or processing system 2000 of FIG. 20, among other components. Sensors 1115 can include any of various sensors, such as a camera, a microphone, an audio sensor, an accelerometer, a pressure sensor, a location sensor, a global positioning system (GPS) sensor, a temperature sensor, a humidity sensor, a magnetic field sensor, an electric field sensor, a light sensor, an infrared light sensor, or a proximity sensor, among other sensors.

Motor assembly 1120 is a motor assembly that provides mechanical force to extend and retract deadbolt 1125. For example, when a user's identity has been validated based on personal data of the user and b-lock 1100 determines to unlock door 1140, motor assembly 1120 can retract deadbolt 1125 to unlock the door.

Figure 16:
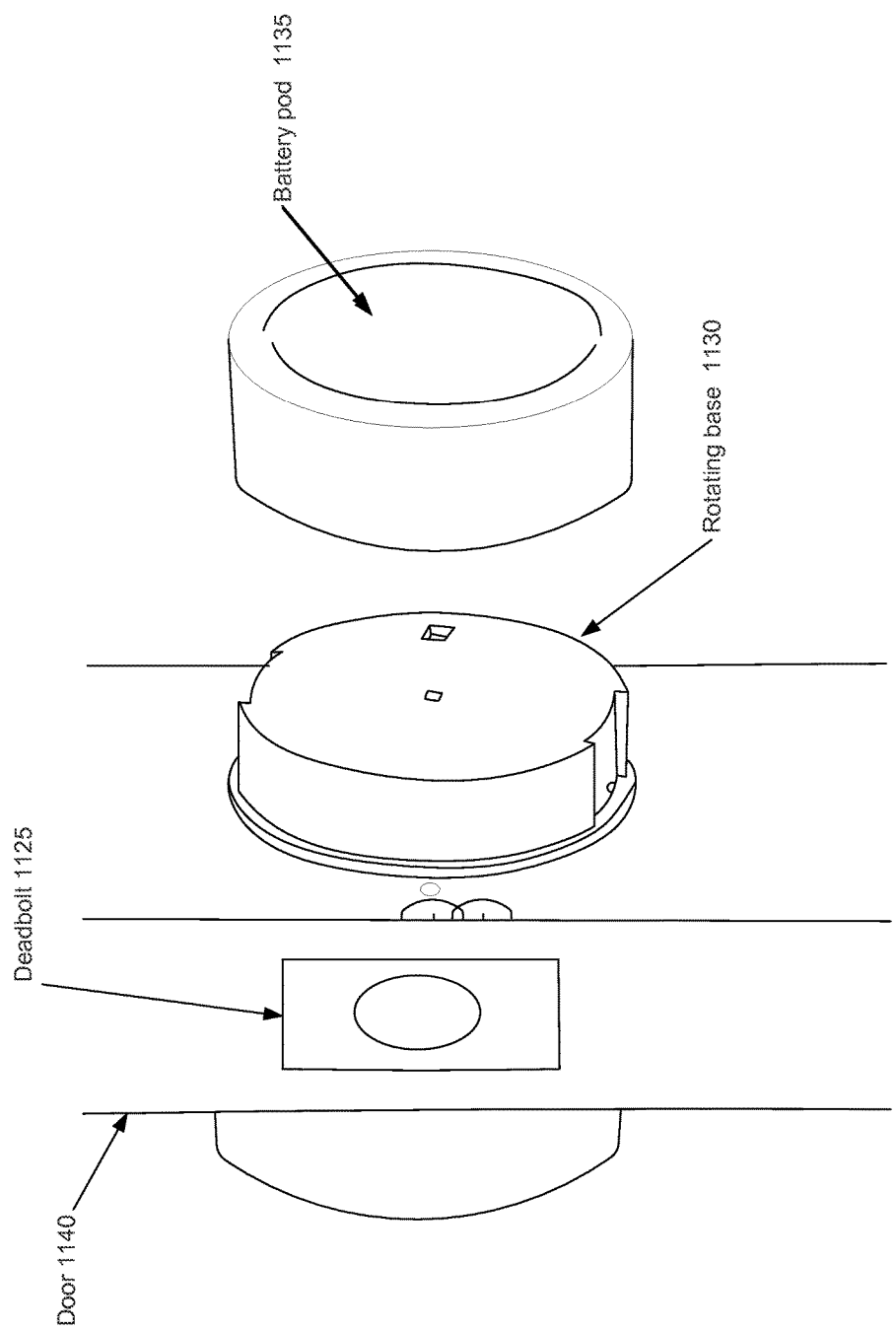
FIG. 16 is an illustration of an angled view of an electronic lock that shows a rotating base and a battery pod that has been removed, consistent with various embodiments.
Figure 18:
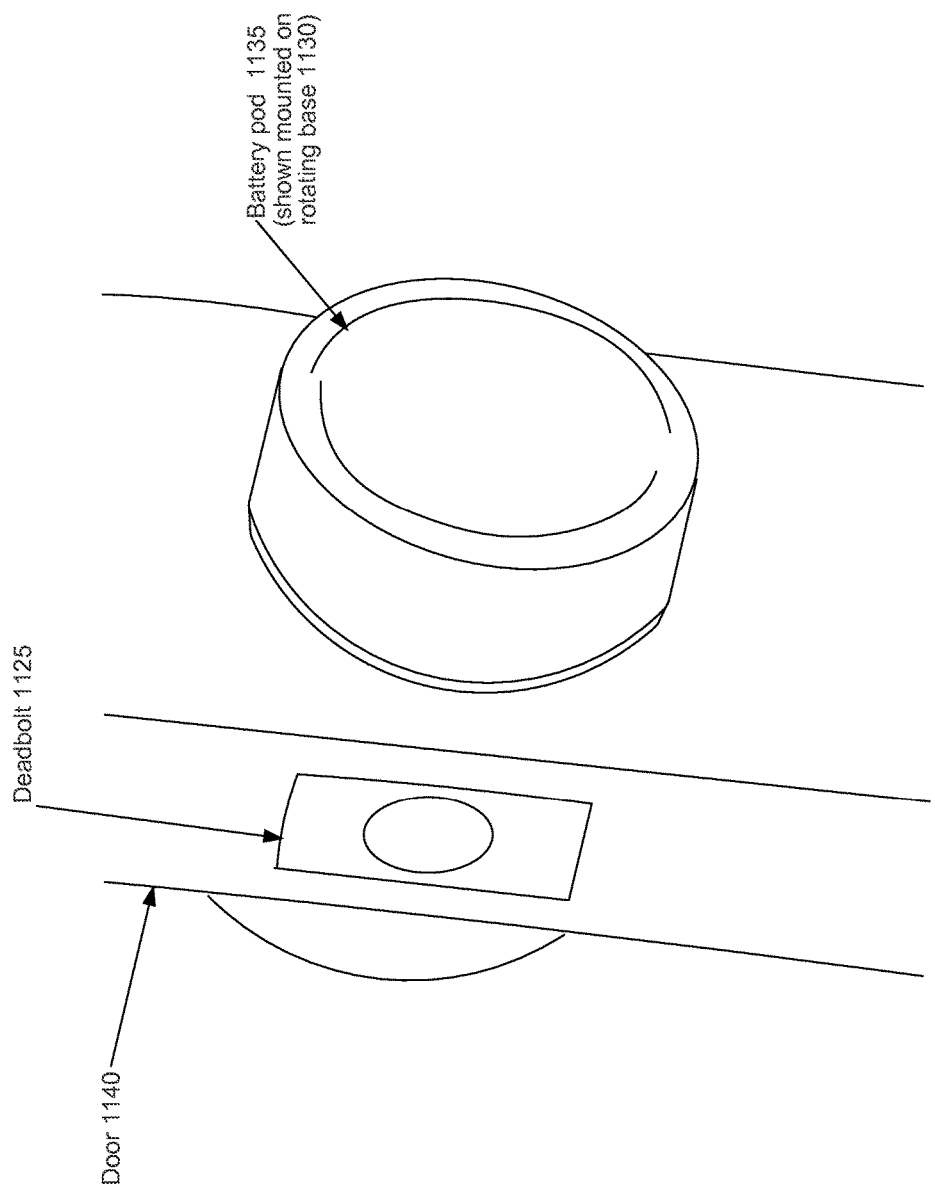
FIG. 18 is an illustration of an angled view of an electronic lock that includes a battery pod mounted on a rotating base, consistent with various embodiments.

Rotating base 1130 is a base that can be manually rotated to lock or unlock deadbolt 1125. Battery pod 1135 can be mounted on or otherwise mechanically coupled to rotating base 1130, as is illustrated in FIGS. 16 and 18. Notch 1910 of FIG. 19 can be used to mechanically couple battery pod 1135 to rotating base 1130, such as by locking battery pod 1135 to rotating base 1140, as is illustrated in FIG. 18. As is illustrated in FIG. 15, battery pod 1135 and rotating base 1130, on which battery pod 1135 is mounted, are interior facing components. To open door 1140 from the inside of, for example, a house that includes door 1140, a user can rotate rotating base 1130 by grabbing and rotating battery pod 1135, which is mechanically coupled to rotating base 1130. Battery pod 1135 can provide force to rotate rotating base 1130.

Figure 17:
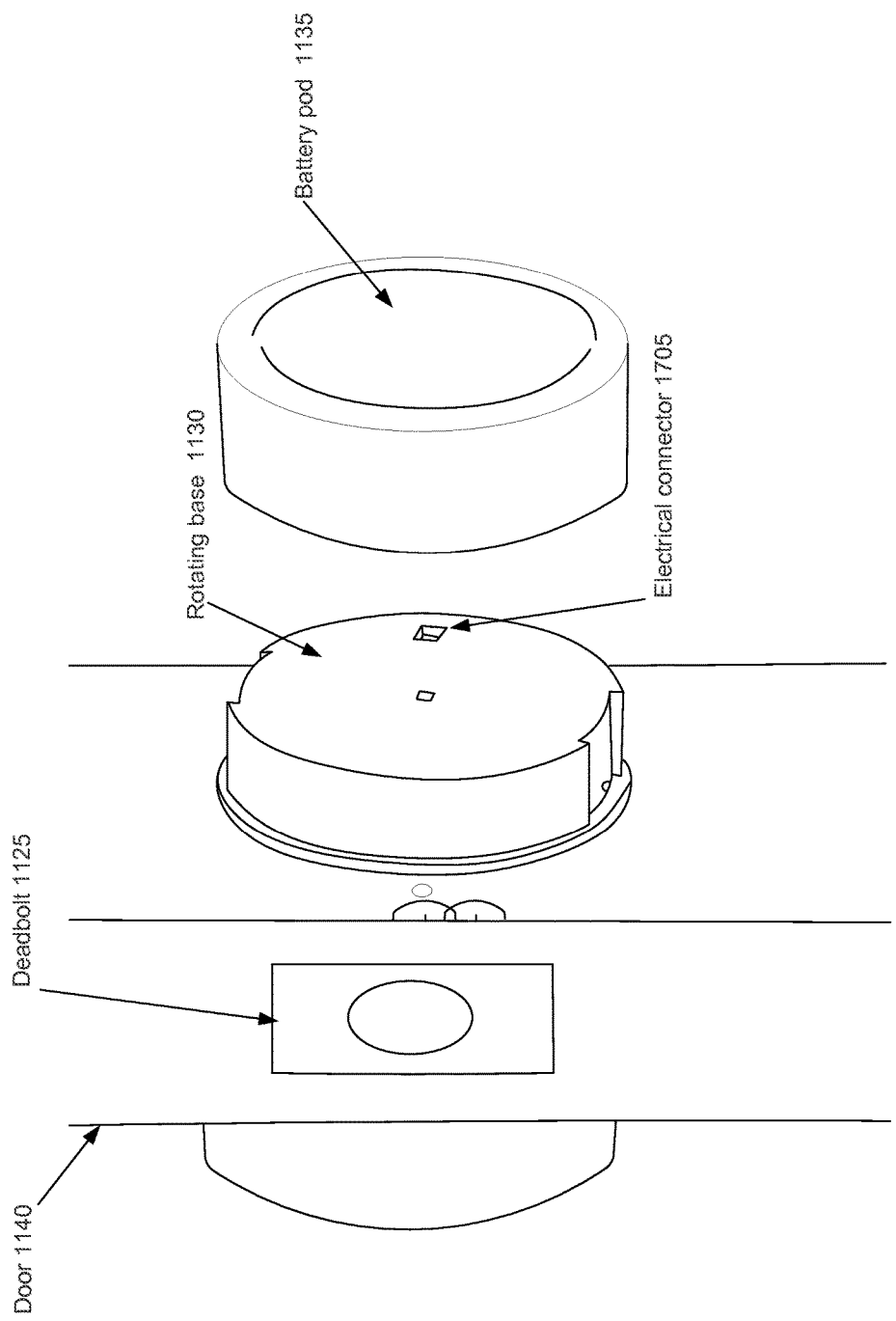
FIG. 17 is a second illustration of an angled view of an electronic lock that shows a rotating base and a battery pod that has been removed, consistent with various embodiments.
Figure 19:
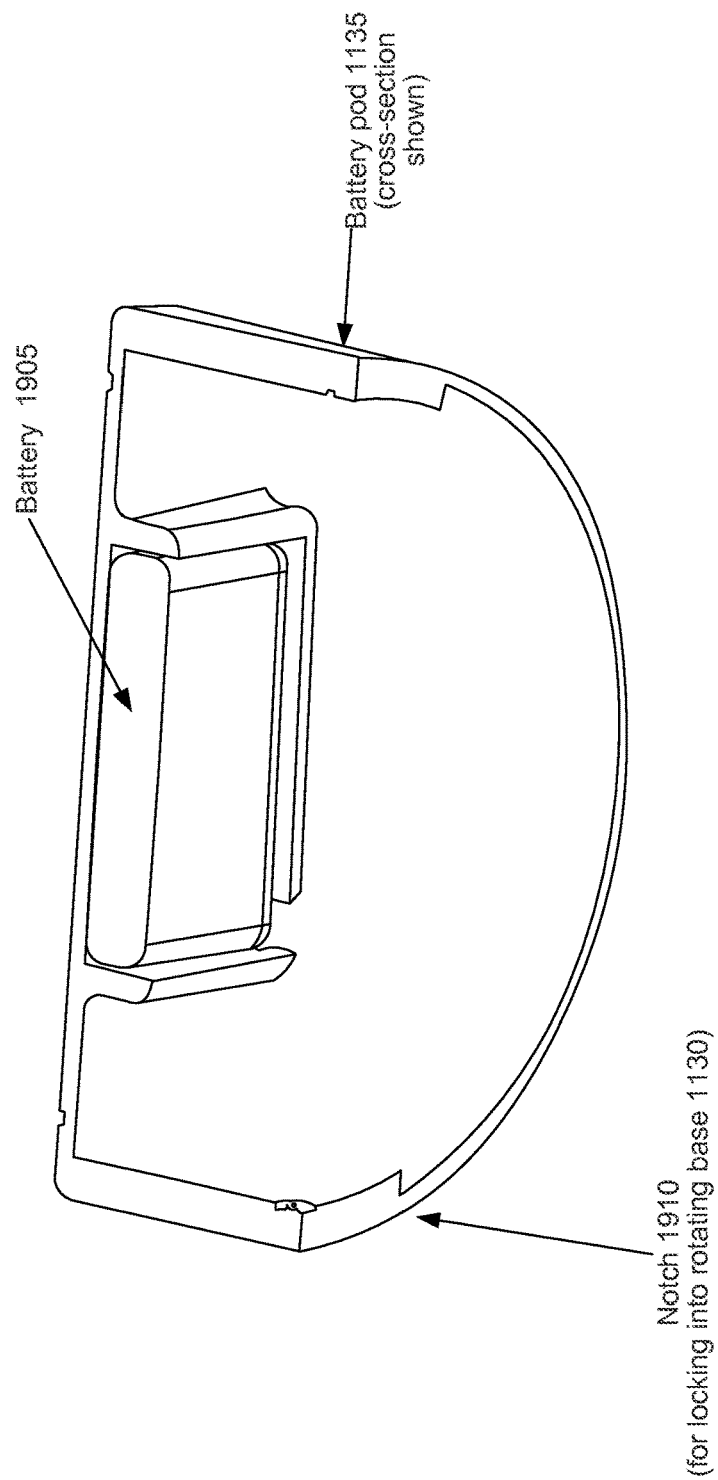
FIG. 19 is a cut-away view of a battery pod, consistent with various embodiments.

Battery pod 1135 is a battery pod for holding batteries. Battery 1905 of battery pod 1135 can be electrically connected to b-lock 1100, for example, by a wire that connects battery 1905 with an electrical connector, such as electrical connector 1705 of FIG. 17. A battery that powers b-lock 1100, such as battery 1905, can be any type of battery, such as a rechargeable battery, a non-rechargeable battery, etc. FIG. 19 shows a cross section of battery pod 1135, and shows the placement of battery 1905 inside of battery pod 1135. A user can detach battery pod 1135 from rotating base 1130, and can remove battery 1905, which can be a single battery or multiple batteries. The user can replace battery 1905 with a new battery or, when battery 1905 is a rechargeable battery, can remove battery 1905 to recharge the battery. In some embodiments, battery pod 1135 includes a charging port, similar to the charging port discussed above, that enables a user to recharge battery 1905 from, for example, the inside of a house for which b-lock 1100 is being used to restrict access.

FIG. 20 is a high-level block diagram showing internal electronics of an electronic lock, consistent with various embodiments. The electronic lock can be a door management platform, such as the door management platform of FIG. 21. The embodiment of FIG. 20 includes b-lock 2001, mobile/web application 2002, wireless transmitter/receiver 2003, micro-controller (MCU) 2004, power source 2005, mechanical motor 2006, biometric authentication device 2007, physical lock 2008, server 2009, output device 2010, input device 2011, charge connector 2012, external power source 2013, and sensor 2014.

The embodiment of FIG. 20 can be broken into a grouping of sub-components that incorporates the standard structure of conventional door locks with moving parts to lock/unlock the door. The door can be any door, such as a door on a building, a door on a car, a door on a safe, a door on a cabinet, etc. Rather than solely relying on physical keys to actuate physical lock 2008, which can be e.g. deadbolt 1125 of FIG. 11, b-lock 2001 includes mechanical motor 2006, which can be a DC motor. Microcontroller (MCU) 2004 can control mechanical motor 2006 and can cause mechanical motor 2006 to open or close physical lock 2008. Mechanical motor 2006 can have associated gears in order to generate the required torque to move physical lock 2008. MCU 2004 can have a local memory that stores any of digital keys, biometric information, access details, logs of user interactions, or associated usage timestamps. MCU 2004 can keep a record of owner or administrator information.

In some embodiments, b-lock 2001 has a single registered owner and has multiple administrators. When a user requests for access via the biometric authentication device 2007, which can be fingerprint scanner 1305 of FIG. 13, the request can be sent to MCU 2004, which is inside b-lock 2001. MCU 2004 can compare the data received from biometric authentication device 2007 to the registered personal data in local memory. If a match is found, the data is deemed valid and MCU 2004 signals mechanical motor 2006 to actuate physical lock 2008 to open the door.

When output device 2010 is a speaker, MCU 2004 can also send a signal to the speaker to cause the speaker to emit a sound indicating a successful authentication. When a match is not found, the data is deemed not valid and MCU 2004 can send a signal to the speaker to cause the speaker to emit a sound indicating an unsuccessful authentication attempt. The speaker can additionally or alternately be used for a variety of purposes. For example, MCU 2004 can send a signal to the speaker that causes the speaker to emit any of various sounds based on any of various occurrences, conditions, etc. The speaker can emit various sounds to indicate, e.g., that the b-lock was successfully locked or unlocked, or that a security mode of the b-lock has been activated, such as via the user's mobile device or a web site, or that valid or invalid biometric data was received by the b-lock, or that a valid or invalid unique identifier was received by the b-lock, etc. Examples of security modes include that the b-lock is locked or unlocked, that the b-lock is set or not set to emit an alarm via output device 2010, etc.

Output device 2010 can be any of various output devices that enable information to be communicated to a user. For example, output device 2010 can be a speaker, a light emitting diode (LED) or other light source, an LED display, a liquid crystal display (LCD), etc.

Input device 2011 can be any of various input devices that enable a user to communicate information to b-lock 2001. For example, input device 2011 can be a keypad, a camera, a microphone, etc. A user can use the keypad to input a password, passphrase, etc. When input device 2011 is a camera, the camera can recognize the face or some other identifiable body part of a user, can recognize physical gestures that a user uses for communication, etc. When input device 2011 is a microphone, a user can speak commands, passwords, pass phrases, etc., which the microphone can receive, and which speech or voice recognition can be used to understand the words spoken, identify the user, etc.

Power source 2005 can operate based on a battery energy source, a wired power outlet, etc. For example, power source 2005 can be based on a rechargeable battery. Charge connector 2012 can be charge connector 2135 of FIG. 21, and can be used to, charge a rechargeable battery of b-lock 2001, to provide power to b-lock 2001, etc. For example, a user can plug one end of a USB to micro-usb cable into an external power source 2013, such as a portable battery pack, a portable computing device, etc., and can plug the other end of the cable into charge connector 2012. External power source 2013 can provide power to charge a rechargeable battery that is part of power source 2005, to directly power the electronics of b-lock 2001, etc.

The lock and unlock status of b-lock 2001 can be presented to the users via output device 2010, such as by a distinctive sound emitted from a speaker, a specific color or flashing pattern of an LED, an icon or message displayed by an LCD, etc. The capability to manually lock and unlock the gate from inside can be maintained through a knob, such as battery pod 1135 of FIG. 11 mounted on rotating base 1130. Users can also use a physical key to lock or unlock b-lock 2001 from the outside, such as by inserting a key into lock cylinder 1205 of FIG. 12.

MCU 2004 can maintain logs of all entries and exits and can transfer the information to a mobile app via wireless communication facilitated by wireless transmitter/receiver 2003 (e.g. Bluetooth, Bluetooth Low Energy (BLE), Wi-Fi, etc.). In the event that a user opens the door with a physical key, this event can be logged and shared with the lock owner. The logs of the door opening and closing through the use of physical key can inform the owner of events such as unauthorized access into a space (e.g. a burglary). A sensing function to determine when physical lock 2008 is manually opened or closed can be implemented by tracking the DC motor output signal change as the bolt of physical lock 2008 is manually actuated. Alternatively, a sensor in b-lock 2001, such as sensor 2014, which can be a capacitive/optical sensor, can track the opening and closing of physical lock 2008.

An electronic lock, such as b-lock 2001, can be equipped with other sensors, such as sensor 2014, which can track vibrations, temperature, etc. Sensor 2014 can be sensors 1115 of FIG. 11, and can include any of various sensors, such as a camera, a microphone, an audio sensor, an accelerometer, a pressure sensor, a location sensor, a global positioning system (GPS) sensor, a temperature sensor, a humidity sensor, a magnetic field sensor, an electric field sensor, a light sensor, an infrared light sensor, or a proximity sensor, among other sensors.

The biometric authentication device 2007 consists of a biometric sensor (e.g. fingerprint, iris, facial pattern, etc.) that collects data from a user. Biometric authentication device 2007 can communicate with both b-lock 2001 and the mobile/web application 2002, which can be on a mobile device of the user, via wires or a wireless communication standard. Biometric authentication device 2007 can capture the user's biometric data and compare the data to the database of users with access to that specific gate. The database of biometric data can reside locally on the MCU 2004 or on server 2009, which can be a cloud server. If the user has access to the gate at that time, b-lock 2001 would unlock the gate/door.

Mobile/web application 2002 helps owners and/or administrators of the gate system to organize and manage access to a protected resource. The log information can help inform the owners/administrators how the resource is accessed. Examples of a protected resource utilizing access control can includes: the entrance to a house or door of a car. Access control can also be applied to objects which have lock mechanisms such as a computers or vehicles. The owner and/or administrators of each b-lock can grant access to other individuals for any period of time via the mobile/web application.

FIGS. 22A-C are flow diagrams illustrating examples of processes to manage access to an area protected by a door management platform, consistent with various embodiments. The processes of FIGS. 22A-C will be explained in conjunction with the door management platform of FIG. 21, which is an illustration of an outside face of a door management platform that includes a keypad and a doorbell, consistent with various embodiments.

The door management platform of the embodiment of FIG. 21, door management platform 2100, includes camera 2105, doorbell button 2110, keypad 2115, microphone 2020, lock cylinder 2125, speaker 2130, and charge connector 2035. Output device 2010 of FIG. 20 can include speaker 2130. Input device 2011 of FIG. 20 can include any of camera 2105, doorbell button 2110, keypad 2115, or microphone 2120, among others. Sensor 2014 of FIG. 20 can include any of camera 2105, doorbell button 2110, keypad 2115, or microphone 2120, among others. Door management platform 2100 can be an electronic lock.

In some embodiments, keypad 2115 is a virtual keypad displayed by a touchscreen display and doorbell button 2110 is a virtual button displayed by the touchscreen display. In some embodiments, door management platform 2100 includes a capacitive sensor to detect a touch of a button of the keypad. In some embodiments, door management platform 2100 includes a force sensor to detect a touch of a button of the keypad. In some embodiments, keypad 2115 is a mechanical keypad.

A door management platform, such as door management platform 2100, can enable a person, such as an administrator of the door management platform, to remotely manage access to an area that is protected by the door management platform. For example, when a door management platform is installed on an entrance door of a home or business, the door management platform can enable a person, such as an administrator of the door management platform, to remotely manage access to the inside of the home or business by use of a mobile device or other connected device, such as a computer.

The area that is protected by the door management platform can be, for example, the inside of an object where access to the inside of the object is restricted by an apparatus, such as door, gate, lid, drawer, etc., that can be secured in a closed position, and in which the door management platform is installed. As another example, the area can be a fenced in area to which access is restricted by a gate a) that is part of a fence that bounds a portion of the fenced in area, and b) in which the door management platform is installed. The object can be a house, building, automotive vehicle, airplane, safe, container, cabinet, etc. The door management platform can protect the area by locking the apparatus, the gate, etc. in a closed position, thereby restricting access to the area.

In addition to enabling delivery of packages, groceries, merchandise, etc. inside a home, business, or other area that is protected by a door where access is managed by a door management platform, the door management platform can enable service people, such as a cable repair person, a house keeper, a dog walker, etc., to enter the house/business/etc. to provide their service.

In some embodiments, a door management platform has an applications programming interface (API) that enables developers to create applications that interface with the platform. For example, a delivery service company can develop an application that can communicate with a door management platform. The communication can be via any of various communication standards and protocols, such as via a short distance wireless communication standard, examples of which include Bluetooth and Bluetooth low energy, via a local area wireless network, examples of which include a Wi-Fi network and an Institute of Electrical and Electronics Engineers (IEEE) 802.11 network, via a cellular network, examples of which include 3G, 4G, Long Term Evolution (LTE), etc.

An application developed by, e.g., a delivery service company can enable a mobile device of a delivery service person to communicate with a door management platform. The mobile device can send identifying information for the delivery person and other information to the platform, which can relay the identifying information to, for example, the home owner that owns the home protected by the door management platform. The identifying information can include, e.g., a photo of the person, the person's name, employee badge number, etc. The mobile device can further send information or data that enables the recipient device to verify that the information is from the delivery service company. With the identifying information verified to be from the delivery service company, and with a visual verification of the delivery person via a camera of the door management platform, the home owner can be confident of the identity and authenticity of the delivery person. The mobile device can further send additional information, such as a tracking number of the delivery, the contents of the delivery, etc.

Companies other than delivery service companies can also develop applications that communicate with the door management platform. For example, a house cleaning company, a dog walking service, etc. can develop an application that runs on a mobile device of a cleaning person, dog walker, etc. When the cleaning person, dog walker, etc. arrives at a home, the mobile device can communicate with the door management platform and send a bill for the cost of the service (e.g., the house cleaning service, the dog walking service) to the platform, which the platform relays to the home owner. The home owner can use his smartphone to pay for the service, which the platform can relay to the mobile device of the person providing the service. As a second example, a mobile device of a cable repair person can communicate with the door management platform, and can provide, for example, an estimated duration for the repair, and can provide updates as the repair progresses.

In one example, a grocery delivery person is to deliver groceries to a house, and approaches a door protected by a door management platform, such as door 2140 that is protected by door management platform 2100. The grocery delivery person uses his mobile device to communicate with platform 2100, and the platform sends a message to the home owner's smartphone notifying him of the grocery delivery. The platform sends one or more photos of the house or instructions that enable the grocery delivery person to correctly identify the door.

For example, when the door is on the side of the house, the door management platform can send a series of photos, a video, written instructions, recorded instructions, etc., that direct the grocery delivery person to the door on the side of the house. The mobile device of the delivery person, or a computer of the delivery service company, can send, via the mobile device of the delivery person or via the Internet, a photo of the delivery person to the door management platform (step 2225). When the photo is sent to the door management platform, the platform can relay the photo to the home owner.

The home owner initiates a live video stream from camera 2105 to his smartphone (step 2210), and, in some embodiments, uses the photo of the delivery person to verify the identity of the delivery person. The owner can use his smartphone to send a message to the door management platform that causes the door management platform to lock or unlock a locking mechanism of the door management platform. This enables the delivery person to open the door/gate/etc. in which the door management platform is installed, and to deliver the goods to the area that is protected by the door management platform.

In some cases, a delivery is being made by a delivery person that does not have a mobile device. The delivery person presses doorbell button 2110. The door management platform sends a message that the delivery person activated the doorbell button to the home owner (step 2205).

In some cases, the delivery person enters data at keypad 2115. The data can be information that identifies the delivery service for which the delivery person is making the delivery. An electronic lock company that sells electronic lock 2100 can maintain a database that enables a delivery company, as well as other types of companies or entities, to register with the electronic lock company. The database can be stored at cloud storage provided by a cloud storage service, can be stored at a computer of the electronic lock company, etc. The electronic lock company can assign the delivery company a unique code that can be used to identify the company, and can similarly assign unique codes to other registered companies/entities.

The database can include the unique code and contact information for the delivery company, as well as secure communication information that enables a computer of or associated with the electronic lock company to securely communicate with a computer of the delivery company. The secure communication information can include, for example, an IP address, URL, etc. of or associated with a computer of the delivery company. The database can further contain registration information of purchasers of electronic locks. For example, the database can include contact information for a person, company, etc. that purchased an electronic lock, along with an address where the electronic lock is installed.

The data entered at keypad 2115 can include the unique code for the delivery company for which the delivery person is making a delivery. Electronic lock 2100 can send the code to a computer of the electronic lock company, where the code is received (step 2250). The electronic lock computer can, based on the unique code, determine the delivery company and, based on the secure communication information, send a secure message to a computer of the delivery company (step 2255). The message can enable the computer of the electronic lock company to verify whether the delivery company has a delivery scheduled at the address where electronic lock 2100 is installed for that day and time.

For example, the message can include commands or information that cause or trigger a query of a database of the delivery service company. The query can determine whether a delivery is scheduled at that time/date at the address where the electronic lock is installed. The electronic lock company computer can receive information that indicates a delivery (step 2260) from the delivery company computer, such as results of the database query, a message confirming that a delivery is scheduled at that time/date, etc. The delivery company computer can further send identifying information of the delivery person. In some embodiments, the data that indicates that a delivery is scheduled is the identifying information. The electronic lock company computer can send the identifying information to the home owner (step 2265). The home owner can be the person to whom the electronic lock is registered (e.g., the owner). In some embodiments, the electronic lock is administered by an administrator, who can be a person authorized by the home owner to administer the electronic lock.

The home owner, based on the notification of step 2205, the video of step 2210, or the message of step 2265, can use his smartphone to initiate a two way audio link between the smartphone and the door management platform by use of microphone 2120 and speaker 2130 (step 2215). This enables the home owner and the delivery person to have a real-time two way conversation. The home owner can identify the delivery person based on the identifying information of step 2225 or step 2265. The home owner asks the delivery person to open the door and deliver the groceries inside the door, and uses his smartphone to send a message to platform 2100 that causes platform 2100 to unlock the door (step 2230). Once the door unlocks, the delivery person opens the door and places the groceries inside the door. As the delivery is happening, camera 2105 can continue to stream live video and the home owner can monitor the grocery delivery person to make sure he doesn't do anything inappropriate.

Once the delivery is complete, the home owner uses his smartphone to electronically capture his signature acknowledging delivery of the groceries. In some embodiments, the smartphone sends the electronically captured signature to door management platform 2100, which relays the signature data to the mobile device of the grocery delivery person. In some embodiments, the smartphone sends the electronically captured signature to a computer of the grocery delivery company for record storage.

When the home owner gets home, he can unlock door management platform 2100 in any of several ways. For example, he can insert a key in lock cylinder 2125 to unlock the platform, he can type in a security code using keypad 2115, he can use his smartphone to unlock the platform, etc. In some embodiments, door management platform 2100 is a biometric lock, and the home owner can unlock door management platform 2100 upon verification of his biometric data.

In some embodiments, door management platform 2100 includes facial recognition functionality. In one example, a person approaches door management platform 2100, and camera 2105 captures an image of the face of the person. The facial recognition functionality recognizes the face as being a face of an authorized user (e.g., a user who is authorized to unlock the door management platform), and unlocks the door management platform to enabled the authorized user to open the door.

In some embodiments, door management platform 2100 includes speech recognition functionality. In one example, a person approaches door management platform 2100, and microphone 2120 captures audio of the person's voice. The speech recognition functionality recognizes the voice as being a voice of an authorized user, and unlocks the door management platform to enabled the authorized user to open the door.

In some embodiments, a door management platform is able to communicate with an autonomous vehicle (step 2235). In one example, an autonomous vehicle is delivering an item to a home owner at the home owner's home. The autonomous vehicle communicates with the door management platform, and the door management platform authenticates the autonomous vehicle (step 2240). For example, the door management platform verifies that the autonomous vehicle is a vehicle of a delivery service, and that the autonomous vehicle is making a delivery to the home of the home owner. In response to the authentication, the door management platform unlocks the locking mechanism to enable the autonomous vehicle to deliver the item inside the doorway of the home (step 2245).

Figure 23:
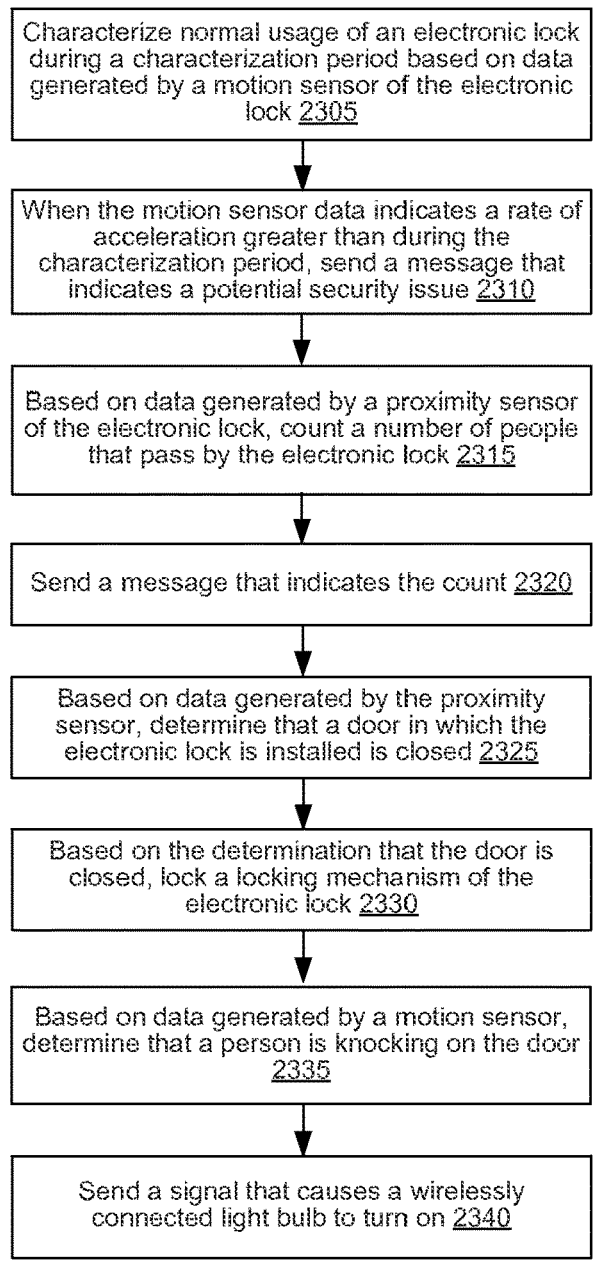
FIG. 23 is a flow diagram illustrating example processes where an electronic lock takes security-related actions based on security-related sensor data, consistent with various embodiments.

FIG. 23 is a flow diagram illustrating example processes where an electronic lock takes security-related actions based on security-related sensor data, consistent with various embodiments. The process of FIG. 23 can be executed by an electronic lock, such as b-lock 101A of FIG. 1A, b-lock 101B of FIG. 1B, b-lock 301 of FIG. 3, b-lock 601 of FIG. 6, b-lock 1100 of FIG. 11, b-lock 2001 of FIG. 20, door management platform 2100 of FIG. 21, etc.

Some embodiments of an electronic lock have a sensor. For example, b-lock 1100 of FIG. 11 includes sensors 1115, and b-lock 2001 includes sensor 2104. A sensor is a device that responds to a physical stimulus and transmits a resulting signal. Examples of physical stimuli include heat, light, sound, pressure, magnetism, an electric field, or motion, among others. A signal from a sensor can be used to determine a measure of a physical stimulus, such as the temperate of the environment of the sensor, the intensity, wavelength, etc. of light, the volume, pitch, etc. of a sound, a measure of the pressure, a measure of the strength, direction, etc. of a magnetic or electric field, a proximity of an object/person/etc. to the sensor, an acceleration of the sensor, a particular location of the sensor, vibrations, etc.

An electronic lock can take an action based on sensor data of a sensor of the electronic lock. Sensor data can be, for example, the signal that is transmitted by a sensor as the sensor responds to a physical stimulus. In some embodiments, an electronic lock takes a security-related action based on security-related data of a sensor of the electronic lock. Security-related sensor data or a security-related action is data or an action related to controlling or restricting access to an area protected by the electronic lock. An example of an area that is protected by an electronic lock is the inside of an object whose access is controlled or restricted by an apparatus, such as door, gate, lid, drawer, etc., that can be secured and locked in a closed position by an electronic lock that is coupled to the apparatus. The object can be a house, building, automotive vehicle, airplane, safe, container, cabinet, etc. The electronic lock can protect the area, e.g., by locking the apparatus in a closed position, thereby restricting access to the area.

A second example of an area that is protected by an electronic lock is a fenced in area to which access is restricted by a gate that is part of a fence that bounds a portion of the fenced in area, and that can be secured and locked in a closed position by an electronic lock that is coupled to the gate.

In some embodiments, the sensor is a motion sensor and the security-related sensor data is data from the motion sensor. The motion sensor data is security-related because it can indicate motion of a door/gate/etc. to which the electronic lock is coupled, and motion of the door/gate/etc. can indicate that the door/gate/etc. is being opened to allow access to an area to which access is restricted by the door/gate/etc., that a person is attempting to break through the door/gate/etc., that a person is knocking on the door/gate/etc., etc.

In an example, a motion sensor of an electronic lock transmits motion sensor data to a processor of the electronic lock during a characterization period during which motion of a door/gate/etc. to which the electronic lock is coupled is deemed to be normal/typical. The electronic lock, or a computer with which the electronic lock can communicate, analyzes and characterizes the motion sensor data from the characterization period (step 2305). The characterization can include, for example, determining a maximum rate of acceleration, a maximum speed of movement, a range of motion, etc.

After the characterization period, the electronic lock or the computer determine that motion sensor data indicates a possible security-related issue. For example, the motion sensor data can indicate an acceleration that is more than a pre-determined amount above a maximum rate of acceleration observed during the characterization period, which can indicate that a person may be trying to break through the door, that a physical altercation may be happening resulting in the door being slammed, etc. When the motion sensor data indicates a possible security-related issue, such as an acceleration more than a pre-determined amount above a maximum rate of acceleration observed during the characterization period, the electronic lock or the computer can send a message that indicates a possible security-related issue (step 2310). The message can be sent to an owner or administrator of the electronic lock, to a third-party, such as a security company, to the police, etc. The pre-determined amount can be zero or any other value.

In some embodiments, the sensor is a proximity sensor and the security-related sensor data is data from the proximity sensor. The proximity sensor data is security-related because it can indicate that a person is near a door and may attempt to break through the door, that a door is in a closed or open position based on the proximity to a door frame in which the door is installed, etc.

In an example, a proximity sensor is able to detect when a door/gate/etc. that includes an electronic lock is open, and is able to detect when people pass by the door/gate/etc. and into or out of an area that is protected by the electronic lock. The electronic lock or a computer with which the electronic lock can communicate are able to use proximity sensor data to count the number of people that pass by the electronic lock (step 2315). The electronic lock or the computer can further maintain a count of the people that pass by the electronic lock to enter or exit the protected area, and can maintain a count of the people that are in the protected area. The electronic lock or the computer can send a message to an owner or administrator of the lock, to a third party, etc., that indicates any of these counts (step 2320).

In another example, the electronic lock or the computer is able to detect when a door/gate/etc. is closed based on the proximity sensor data (step 2325). For example, when an electronic lock is coupled to a door, the electronic lock or the computer can determine, based on the proximity data, that the door is adjacent to a door frame in which a door is installed. The electronic lock can further determine the position of a locking mechanism of the electronic lock, and can determine if the locking mechanism is locked or unlocked. When the door is closed and the locking mechanism is unlocked, the electronic lock can lock the locking mechanism (step 2330), such that the door is locked in a closed position where it restricts entry into an area that is protected by the electronic lock.

In some embodiments, the sensor is a motion sensor or a microphone. The motion sensor data and the microphone data are security-related because either can indicate that someone is knocking on the door. When the sensor is a motion sensor, a processor of the electronic lock or a computer with which the electronic lock can communicated can determine, based on the motion sensor data, that a person is knocking on the door (step 2335). When the sensor is a microphone, the processor or computer can determine, based on microphone data that indicates sounds that are indicative of someone knocking on the door, that a person is knocking on the door. Based on a determination that a person is knocking on the door, the electronic lock or the computer can send a signal to a wirelessly connected light bulb that causes the light bulb to illuminate an area near the electronic lock (step 2340). For example, the light bulb can illuminate the area in front of the door, can illuminate an area inside of the house that contains the door, etc.

An electronic lock can take any of various security-related actions based on security-related sensor data. For example, when a proximity sensor of the electronic lock indicates that a person is within a predetermined distance of the sensor, the electronic lock can initiate a video stream to an administrator/owner of the electronic lock using a camera of the electronic lock, can initiate an audio stream to the administrator/owner using a microphone and/or speaker of the electronic lock, etc. The administrator/owner can use the video stream to see what is going on near the door, and can use a two-way audio stream to talk to a person that is near the electronic lock.

In another example, when security-related sensor data indicates a possible security-related issue, the electronic lock or a computer with which the electronic lock can communicate can cause a signal to be sent to a speaker of the electronic lock, to cause the speaker to emit an alarm sound. In yet another example, when security-related sensor data indicates a possible security-related issue, the electronic lock or the computer can cause a signal to be sent that causes a camera of the electronic lock to begin recording or taking images, for example, to capture an image or video of a burglar who is attempting to break into an area protected by the electronic lock.

Figure 24:
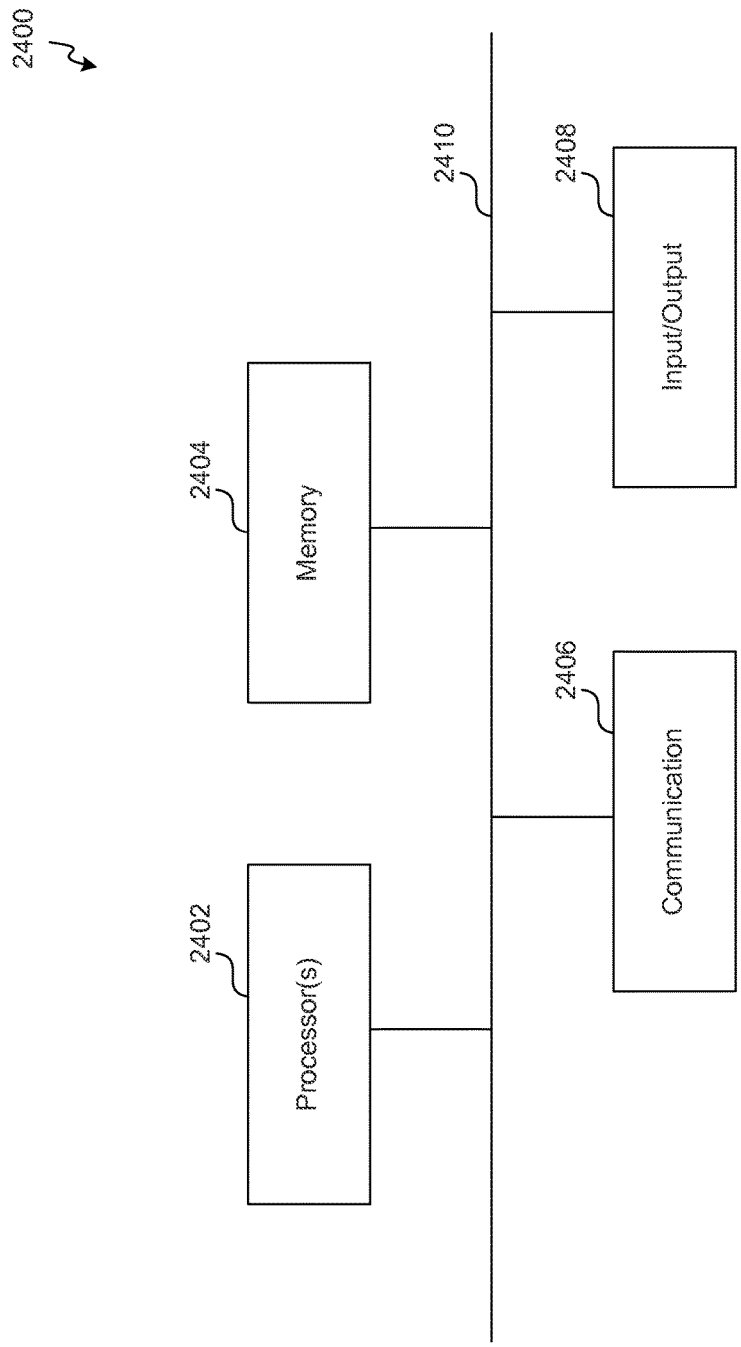
FIG. 24 is a block diagram illustrating an example of a processing system in which at least some operations described herein can be implemented, consistent with various embodiments.

FIG. 24 is a high-level block diagram showing a processing system, consistent with various embodiments, in which at least some operations related to the disclosed technology can be implemented. The embodiment of FIG. 24 can represent, for example, b-lock 101A or 101B, b-lock 201, b-lock 301, wireless transmitter/receiver 303, micro controller 304, biometric data device 307, b-lock 501, b-lock 601, wireless transmitter/receiver 603, micro controller 604, biometric data device 607A, 607B, or 607C, server 609, the computing device on which mobile/web application 302, 602A, or 602B is executed, server 1009, the computing device on which mobile/web application 1002A or 1002B is executed, biometric data device 1007, b-lock 1100, b-lock 2001, microcontroller 2004, wireless transmitter/receiver 2003, biometric data device 2007, server 2009, the computing device on which mobile/web application 2002 is executed, or door management platform 2100, among others. Any of these processing systems may include two or more processing devices such as represented in FIG. 24, which may be coupled to each other via a network or multiple networks. A network can be referred to as a communication network.

In the illustrated embodiment, the processing system 2400 includes one or more processors 2402, memory 2404, a communication device 2406, and one or more input/output (I/O) devices 2408, all coupled to each other through an interconnect 2410. In some embodiments, each device is a module in a device that includes the module, as well as other modules. The interconnect 2410 may be or include one or more conductive traces, buses, point-to-point connections, controllers, adapters and/or other conventional connection devices. Each processor 2402 may be or include, for example, one or more general-purpose programmable microprocessors or microprocessor cores, microcontrollers, application specific integrated circuits (ASICs), programmable gate arrays, or the like, or a combination of such devices. The processor(s) 2402 control the overall operation of the processing device 2400. Memory 2404 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 2404 may store data and instructions that configure the processor(s) 2402 to execute operations in accordance with the techniques described above. The communication device 2406 may be or include, for example, an Ethernet adapter, cable modem, Wi-Fi adapter, cellular transceiver, Bluetooth transceiver, or the like, or a combination thereof. Depending on the specific nature and purpose of the processing device 2400, the I/O devices 2408 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A door management platform, for remotely managing access to an area, comprising:
   an electronic locking device comprising:
      a device first side comprising a cover having a cover surface, a processor, a microphone, a speaker, a camera, a code input device, a keyhole, and a wireless communication interface coupled to the processor;

a device second side comprising a motor assembly electronically coupled to the processor, a rotatable base having a rotatable base surface, and a rotatable battery pod; and a deadbolt, wherein the device first side, the device second side, and the deadbolt are mountable to a door that separates an exterior space from the area, wherein, when the device is mounted to the door, the cover surface faces a first direction away from the door and the rotatable base surface faces a second direction away from the door opposite the first direction, wherein the microphone and the speaker are electronically coupled to the wireless communication interface and form a two-way real-time audio connection when activated to enable a user and a person requesting access to the area to communicate, wherein the camera is coupled to the wireless communication interface and is configured to capture a real-time stream of video when activated, wherein, when the device is mounted to the door, the camera has a line of sight away from the door, wherein, when the device is mounted to the door and the door is open, the line of sight is at least partially directed toward the area, wherein, when the device is mounted to the door and the door is closed, the line of sight is directed away from the area, wherein the electronic locking device is associated with a first company and is configured to send, via the wireless communication interface, the real-time stream of video to a computing device to enable the user to see the person requesting access to the area protected by the electronic locking device, wherein the electronic locking device is in data communication with a server, and wherein the server is in data communication with a backend system of a second company, wherein the device has a locked configuration and an unlocked configuration when the device is mounted to the door, wherein the rotatable base is in a rotatable base first position relative to the door when the device is in the locked configuration and the rotatable base is in a rotatable base second position relative to the door when the device is in the unlocked configuration, and wherein the rotatable base is rotatable between the rotatable base first and second positions, wherein the rotatable battery pod is removably attachable to the rotatable base, wherein the rotatable battery pod has a rechargeable battery, wherein, when the rotatable battery pod is removably attached to the rotatable base, the rotatable battery pod has a pod surface facing the second direction, wherein the rotatable battery pod is in a rotatable battery pod first position relative to the door when the device is in the locked configuration and the rotatable battery pod is in a rotatable battery pod second position relative to the door when the device is in the unlocked configuration, wherein the rotatable battery pod is rotatable between the rotatable battery pod first and second positions, and wherein, when the rotatable battery pod is removably attached to the rotatable base, rotating the rotatable battery pod rotates the rotatable base between the first and second positions, wherein, when the device is mounted to the door, the motor assembly is coupled to the deadbolt and is configured to lock or unlock the deadbolt in response to a message received from the backend system of the second company, wherein a mobile device of the person has a location sensor, and wherein the processor is configured to perform an action when the location sensor is proximate to a selected location, wherein the backend system of the second company is configured to receive a signal from a device of the person requesting access, and wherein the signal comprises a package tracking number, and wherein a device of the person requesting access is configured to send a signal that enables the electronic locking device to verify that the signal is from a delivery service company.

2. The door management platform of claim 1, wherein the electronic locking device is configured to communicate with a mobile device of the person.

3. The door management platform of claim 2,
wherein the door management platform is configured to receive, from the computing device an electronic signature to acknowledge delivery of an item, and
wherein the door management platform is configured to send the electronic signature to a receiver.

4. The door management platform of claim 3, wherein the receiver comprises any of the mobile device and the backend system of a company.

5. The door management platform of claim 2,
wherein the person comprises a delivery person for a company; and wherein the electronic locking device is configured to receive, via the mobile device, verification for the delivery person from the backend system of the company.

6. The door management platform of claim 5,
wherein personal data of the delivery person is within the backend system and is provided to the computing device for verification by the user.

7. The door management platform of claim 6,
wherein the personal data includes any of a global positioning system (GPS) location, name, employee number and photo of the delivery person, that the user can use to identify the delivery person.

8. The door management platform of claim 2,
wherein the person comprises a delivery person for a company; and wherein a one-time code is sent to the mobile device and the door management platform to verify the delivery person.

9. The door management platform of claim 2,
wherein the electronic locking device is configured to communicate with the mobile device via any of a short distance wireless communication standard, a local area wireless network, or a cellular network.

10. The platform of claim 1, further comprising a motion sensor, wherein the motion sensor is configured to initiate alerts over the wireless communication interface when the motion sensor is triggered by a motion.

11. The door management platform of claim 1, wherein the second company is a delivery company.

12. The door management platform of claim 1, wherein the backend system of the second company is configured to transfer money between a user account and an online account.

13. The door management platform of claim 1, wherein the server is configured to receive access identifying information from the backend system of the second company.

14. The door management platform of claim 1, wherein the package tracking number comprises access identifying information.

15. The door management platform of claim 1, wherein the backend system of the second company is configured to receive a delivery acknowledgement signal from the door management platform.

16. A method for utilizing a door management platform, for remotely managing access to an area, the door management platform comprising an electronic locking device mountable to a door, the method comprising:

rotating a rotatable base of the electronic locking device from a rotatable base first position to a rotatable base second position, wherein the device has a locked configuration and an unlocked configuration when the device is mounted to a door, wherein the rotatable base is in the rotatable base first position relative to the door when the device is in the locked configuration and the rotatable base is in the rotatable base second position relative to the door when the device is in the unlocked configuration;

rotating a rotatable battery pod of the electronic locking device from a rotatable battery pod first position to a rotatable battery pod second position, wherein the rotatable battery pod is in the rotatable battery pod first position relative to the door when the device is in the locked configuration and the rotatable battery pod is in the rotatable battery pod second position relative to the door when the device is in the unlocked configuration, wherein the rotatable battery pod is removably attachable to the rotatable base, wherein the rotatable battery pod has a rechargeable battery, wherein, when the rotatable battery pod is removably attached to the rotatable base, rotating the rotatable battery pod rotates the rotatable base between the first and second positions, and wherein the electronic locking device further comprises:

a device first side comprising a cover having a cover surface, a processor, a microphone, a speaker, a camera, a code input device, a keyhole, and a wireless communication interface coupled to the processor;

a device second side comprising a motor assembly electronically coupled to the processor, the rotatable base having a rotatable base surface, and the rotatable battery pod; and a deadbolt, wherein the device first side, the device second side, and the deadbolt are mountable to the door that separates an exterior space from the area, wherein, when the device is mounted to the door, the cover surface faces a first direction away from the door and the rotatable base surface faces a second direction away from the door opposite the first direction, wherein the microphone and the speaker are electronically coupled to the wireless communication interface and form a two-way real-time audio connection when activated to enable a user and a person requesting access to the area to communicate, wherein the camera is coupled to the wireless communication interface and is configured to capture a real-time stream of video when activated, wherein, when the device is mounted to the door, the camera has a line of sight away from the door, wherein, when the device is mounted to the door and the door is open, the line of sight is directed toward the area, wherein, when the device is mounted to the door and the door is closed, the line of sight is directed away from the area, wherein the electronic locking device is associated with a first company and is configured to send, via the wireless communication interface, the real-time stream of video to a computing device to enable the user to see the person requesting access to the area, wherein, when the rotatable battery pod is removably attached to the rotatable base, the rotatable battery pod has a pod surface facing the second direction, wherein, when the device is mounted to the door, the motor assembly is coupled to the deadbolt and is configured to lock or unlock the deadbolt in response to a message received from a backend system of a second company;

sending, via the code input device by the person requesting access to the area, identifying data to a server;

communicating, from the server to the backend system of the second company, a secure message for verifying the identifying data;

initiating a real-time stream of video captured from the camera when a motion sensor initiates an alert over the wireless communication interface when the motion sensor is triggered by a motion;

sending, via the wireless communication interface, the real-time stream of video captured from the camera to a computing device to enable the user to see the person requesting access to the area protected by the electronic locking device, communicating data between the server and the electronic locking device, communicating data between the server and the backend system of a second company, initiating a two-way real-time audio connection between the electronic locking device and the computing device to enable the user and the person to be able to communicate, locking or unlocking the deadbolt in response to a message received from the backend system of the second company, wherein the identifying data is a one-time code securely sent to a mobile device of the person requesting access to the area, sensing a location of the person with a location sensor on a mobile device of the person, and performing an action by the processor when the sensed location of the person is proximate to a selected location, receiving, via the backend system of the second company, a signal from a device of the person requesting access, wherein the signal comprises a package tracking number; and sending a signal from a device of the person requesting access that enables the electronic locking device to verify that the signal is from a delivery service company.

17. The method of claim 16, wherein the electronic locking device is configured to communicate with a mobile device of the person.

18. The method of claim 17, including
receiving by the door management platform an electronic signature to acknowledge delivery of an item, and
sending by the door management platform the electronic signature to a receiver.

19. The method of claim 17, wherein the receiver comprises any of the mobile device and the backend system of the company.

20. The method of claim 17, wherein the person comprises a delivery person for a company; and wherein the electronic locking device is configured to receive, via the mobile device, verification for the delivery person from a backend system of the company.

21. The method of claim 17, wherein personal data of the delivery person is within the backend system and is provided to the computing device for verification by the user.

22. The method of claim 21, wherein the personal data includes any of a global positioning system (GPS) location, name, employee number and photo, of the delivery person, that the user can use to identify the delivery person, the photo being an electronic copy of a photo of the person requesting access.

23. The method of claim 17, wherein the person comprises a delivery person for a company; and wherein a one-time code is sent to the mobile device and the electronic locking device to verify the delivery person.

24. The method of claim 17, wherein the electronic locking device is configured to communicate with the mobile device of the person via any of a short distance wireless communication standard, a local area wireless network, or a cellular network.

25. The method of claim 16, further comprising sensing motion proximate to the electronic locking device with a motion sensor, and communicating alerts over the wireless communication interface when motion is sensed.

26. The method of claim 16, wherein the second company is a delivery company.

27. The method of claim 16, further comprising transferring money between a user account and an online account via the backend system of the second company.

28. The method of claim 16, further comprising receiving, via the server, access identifying information from the backend system of the second company.

29. The method of claim 28, wherein the package tracking number comprises access identifying information.

30. The method of claim 16, further comprising receiving, via the backend system of the second company, a delivery acknowledgement signal from the door management platform.

* * * * *